US007365946B2

(12) United States Patent
Nakamura et al.

(10) Patent No.: US 7,365,946 B2
(45) Date of Patent: Apr. 29, 2008

(54) RECORDER/REPRODUCER

(75) Inventors: Mamoru Nakamura, Tokyo (JP);
Tadami Nakamura, Saitama (JP);
Takashi Takamatsu, Tokyo (JP);
Manabu Sato, Kanagawa (JP)

(73) Assignee: Sony Corporation, Tokyo (JP)

( * ) Notice: Subject to any disclaimer, the term of this patent is extended or adjusted under 35 U.S.C. 154(b) by 433 days.

(21) Appl. No.: 10/502,941

(22) PCT Filed: Nov. 7, 2003

(86) PCT No.: PCT/JP03/14197

§ 371 (c)(1),
(2), (4) Date: Jul. 29, 2004

(87) PCT Pub. No.: WO2004/042726

PCT Pub. Date: May 21, 2004

(65) Prior Publication Data

US 2005/0149957 A1    Jul. 7, 2005

(30) Foreign Application Priority Data

Nov. 8, 2002    (JP)    ............................. 2002-326149

(51) Int. Cl.
*G11B 5/54* (2006.01)
(52) U.S. Cl. ................. 360/255.2; 360/255.4
(58) Field of Classification Search ............... None
See application file for complete search history.

(56) References Cited

U.S. PATENT DOCUMENTS 6,088,203 A * 7/2000 Nakamura et al. ....... 360/255.2
6,137,770 A * 10/2000 Fujisawa ................... 720/729
6,249,501 B1 * 6/2001 Nakamura et al. .......... 720/640
6,865,060 B2 * 3/2005 Kurozuka et al. ........ 360/255.2

FOREIGN PATENT DOCUMENTS

JP      2001-23327    1/2001
WO      98/2882       1/1998

* cited by examiner

Primary Examiner—William Korzuch
Assistant Examiner—Tawfik Goma
(74) Attorney, Agent, or Firm—Oblon, Spivak, McClelland, Maier & Neustadt, P.C.

(57) ABSTRACT

A recording/reproducing apparatus includes a cartridge holder which is rotatably provided on a chassis, into which a disc cartridge enclosing a magneto-optical disc is inserted, and which holds the inserted disc cartridge, an optical pickup that irradiates laser light onto the magneto-optical disc, a magnetic head that is provided on the upper surface side of the cartridge holder facing the optical pickup and that is moved between a lowered position close to the optical disc and a raised position away from the magneto-optical disc, at least one first sliding member that is movably provided on the cartridge holder, a head raising/lowering mechanism that moves the magnetic head between the upper position and the lower position by moving the first sliding member, and a driving mechanism that is disposed on a lower surface side of the chassis, engages the sliding member, and moves the first sliding member.

25 Claims, 15 Drawing Sheets

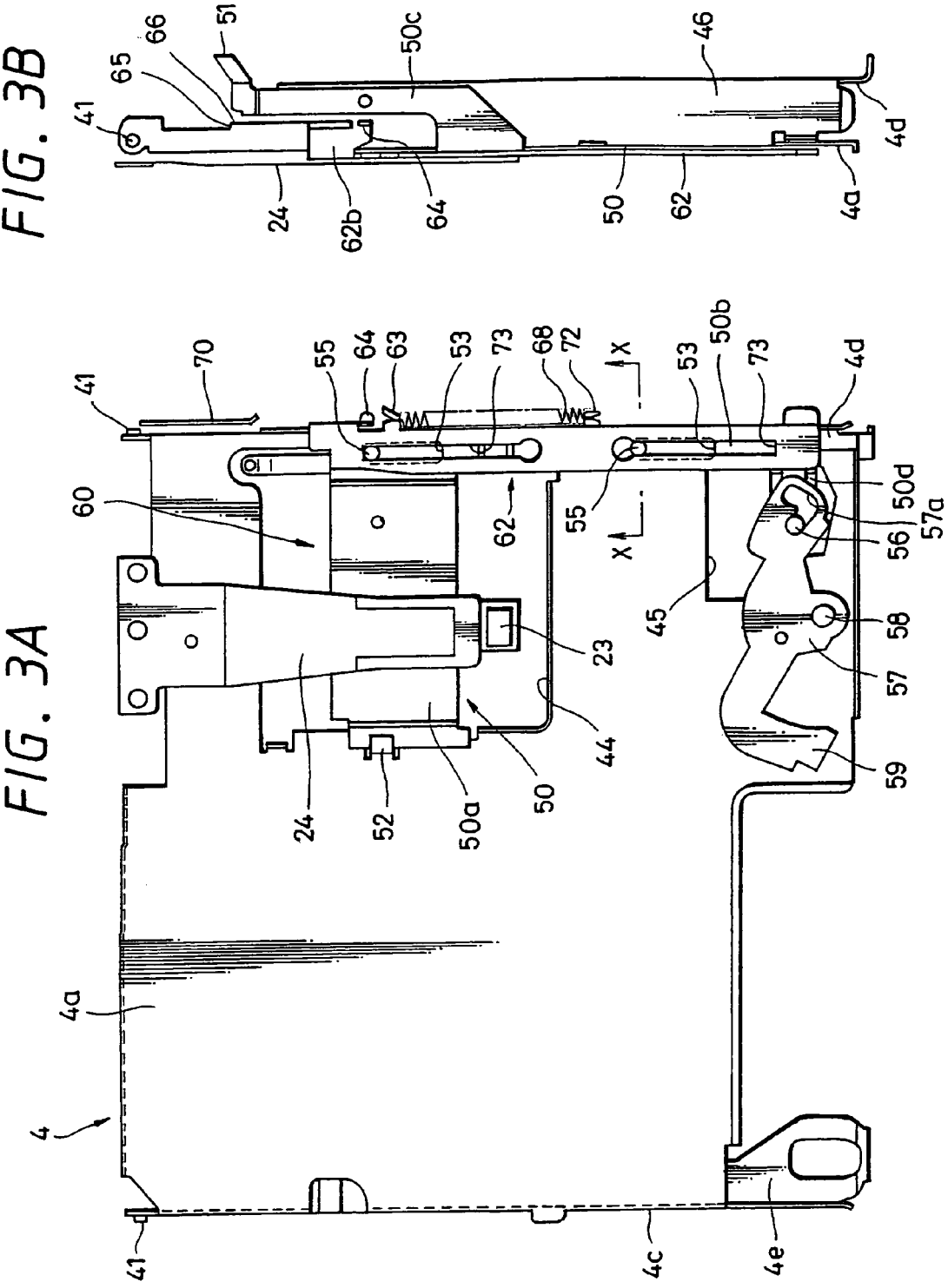

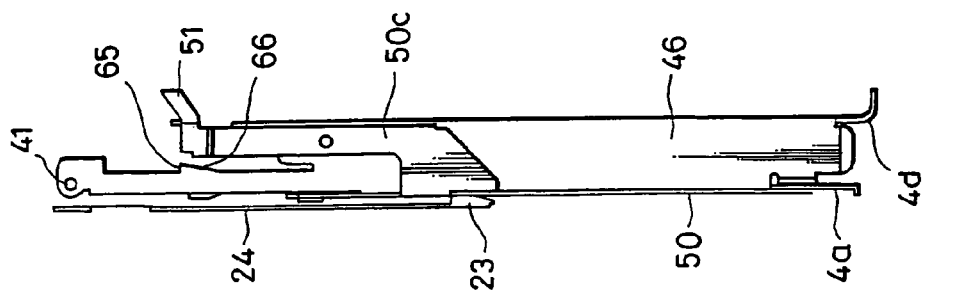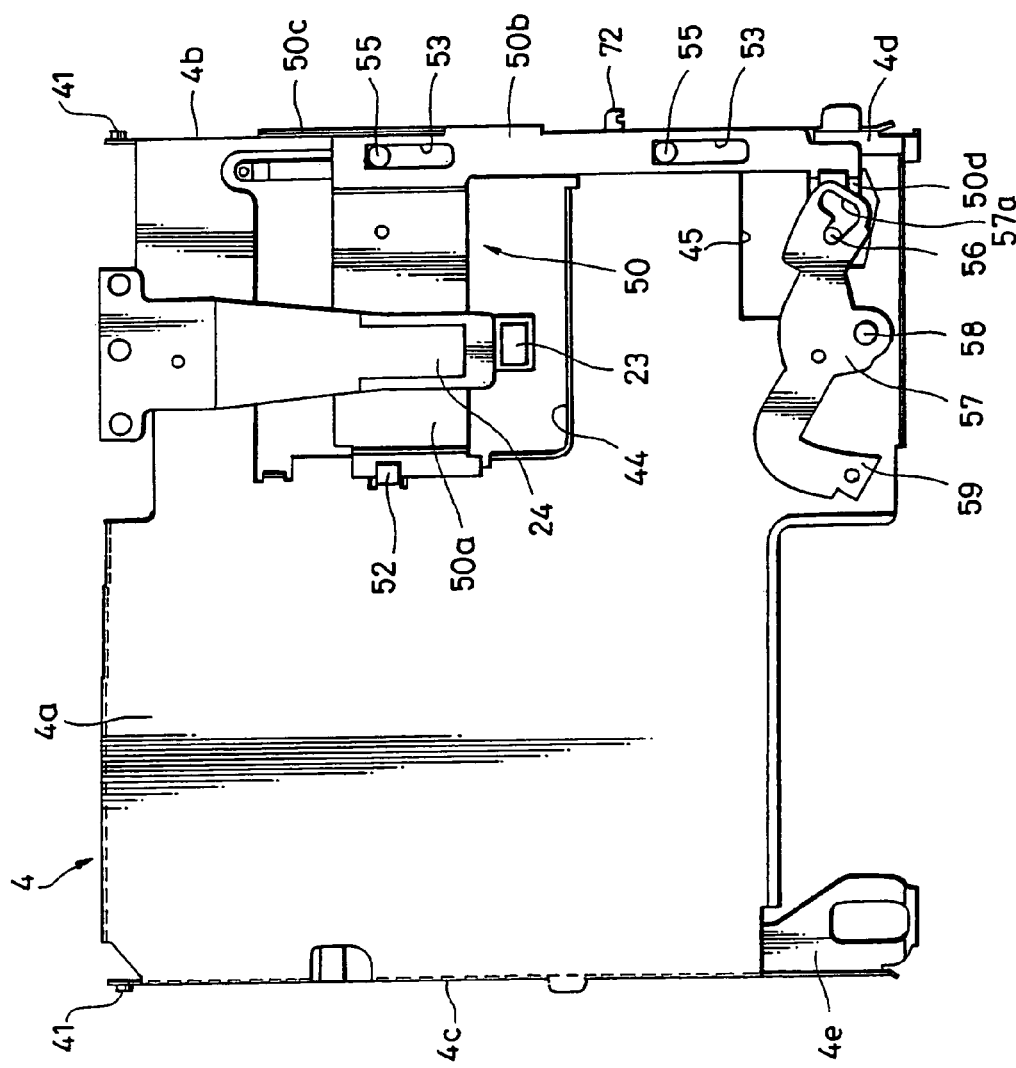

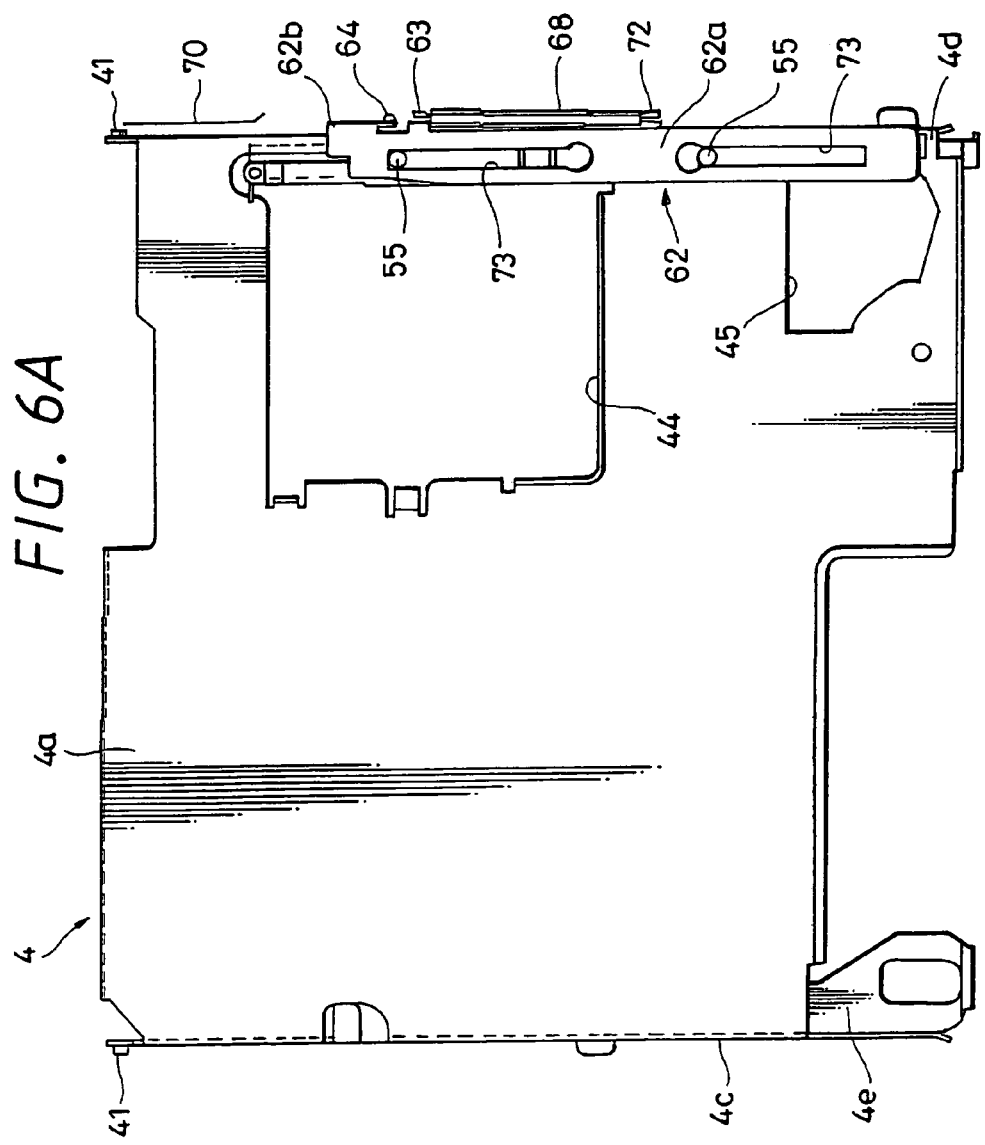

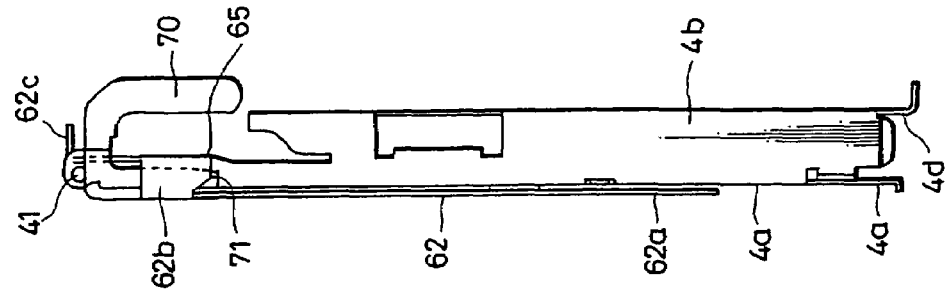
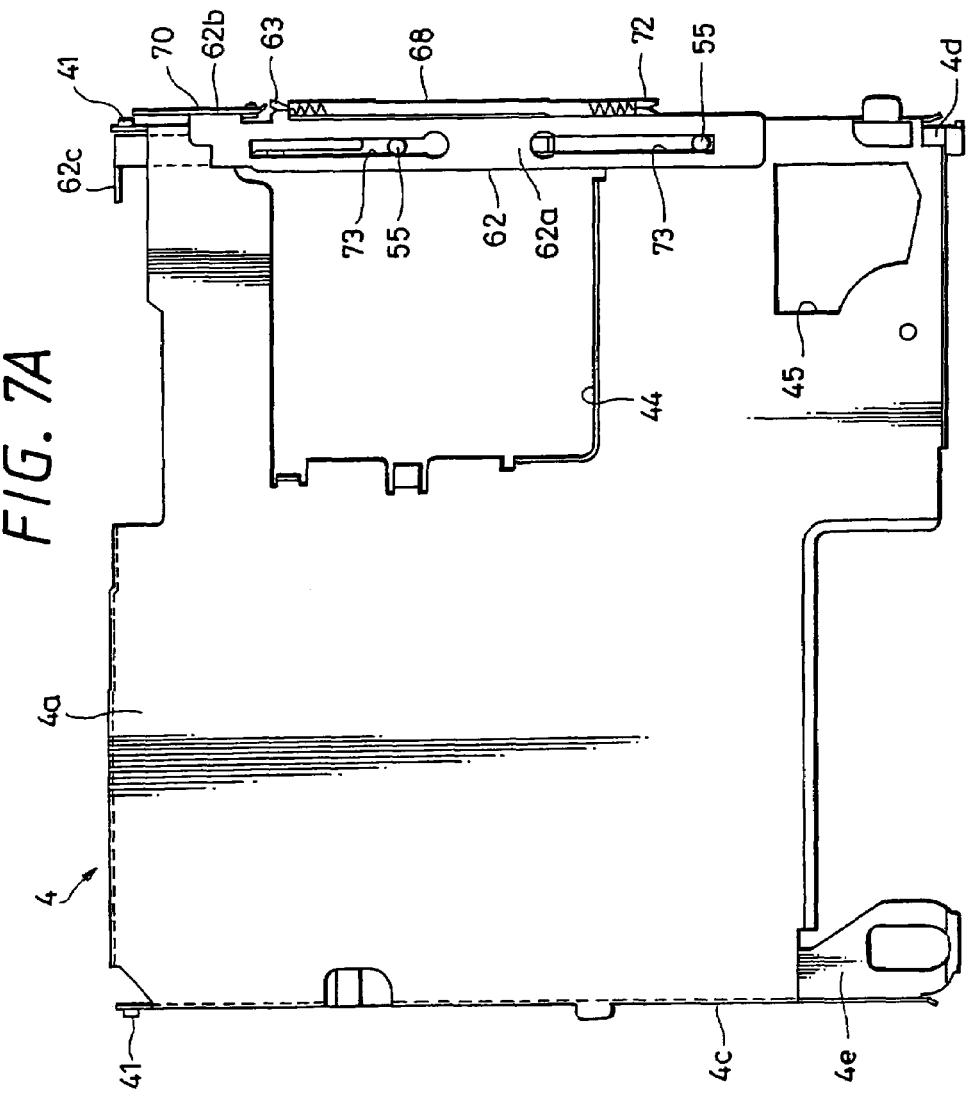

RECORDER/REPRODUCER

TECHNICAL FIELD

The present invention relates to a recording/reproducing apparatus. In particular, the present invention relates to a recording/reproducing apparatus with a head raising/lowering mechanism.

BACKGROUND ART

A disc recording/reproducing apparatus used for optical recording and reproduction is equipped with an optical pickup for reading a signal recorded on a disc (magneto-optical disc) that is a recording medium and also a recording head corresponding to the optical pickup.

The recording head applies a magnetic field for writing a signal onto a disc, and is raised and lowered as necessary. That is, since the recording head is not needed during the reproduction of signals, the recording head is raised so as to separate the recording head from an information recording surface of the disc and during the recording of signals, the recording head is lowered so as to approach the information recording surface of the disc and applies a magnetic field for recording signals onto the disc.

In a disc recording/reproducing apparatus equipped with a head raising/lowering mechanism for raising and lowering the recording head, a motor is used as the driving source of the head raising/lowering mechanism, that is, the motor is driven to operate the head raising/lowering mechanism and thereby raise or lower the recording head.

A construction in which the motor that is the driving source of the head raising/lowering mechanism is disposed on the optical pickup (see "Patent Document 1") and a construction where the motor is disposed on a cartridge holder that holds a disc cartridge (see "Patent Document 2") and the like are known as conventional examples of this kind of disc recording/reproducing apparatus.

Patent Document 1
  Japanese Laid-Open Patent Publication No. H10-40632

Patent Document 2
  Japanese Laid-Open Patent Publication No. H8-36800

With both of these conventional disc recording/reproducing apparatuses, a large space is required for disposing the motor that is the driving source of the head raising/lowering mechanism, so that the overall apparatus size is increased and it is difficult to make the apparatuses smaller or slimmer.

Recently, there is especially strong demand for apparatuses to be made smaller and/or slimmer, so that there is demand for a disc recording/reproducing apparatus construction that can satisfy such demand.

DISCLOSURE OF THE INVENTION

The present invention was conceived in view of the above problem, and it is an object of the present invention to provide a disk recording/reproducing apparatus that can be made considerably smaller and slimmer by using a new construction for a disc recording/reproducing apparatus with a head raising/lowering mechanism.

A recording/reproducing apparatus according to the present invention includes:
  a cartridge holder that is rotatably provided in a chassis and into which a disc cartridge, in which a magneto-optical disc is enclosed, is inserted, the cartridge holder holding the inserted disc cartridge;
  an optical pickup that irradiates laser light onto the magneto-optical disc;
  a magnetic head that is disposed so as to face the optical pickup on an upper surface side of the cartridge holder and is moved between a lowered position close to the magneto-optical disc and a raised position away from the magneto-optical disc;
  at least one moving member provided so as to be free to move on the cartridge holder;
  a head raising/lowering mechanism that moves the magnetic head between the raised position and the lowered position by moving the at least one moving member; and
  a moving mechanism that is disposed on a lower surface side of the chassis, engages the at least one moving member, and moves the at least one moving member.

In addition, the apparatus may include an arm member, on one end of which the magnetic head is provided, and another end of which is connected to the optical pickup so that the arm member can rotate between the raised position and the lowered position, with the optical pickup being supported on the chassis so as to be freely movable in a radial direction of the magneto-optical disc, and the arm member being disposed so as to be positioned on an upper surface side of the disc cartridge.

Also, the head raising/lowering mechanism may include a raising/lowering operating part that lifts the arm member when the driving mechanism has moved the at least one moving member to a first position that has the magnetic head moved to the raised position, and releases support of the arm member when the at least one moving member has been moved to a second position that moves the magnetic head to the lowered position, and the raising/lowering operating part may be integrally formed with the at least one moving member.

In addition, an opening may be formed on the upper surface of the cartridge holder, the at least one moving member may be provided so as to be freely movable on the upper surface of the cartridge holder so as to be able to move in a direction parallel to a direction in which the disc cartridge is inserted into the cartridge holder, and the raising/lowering operating unit may be provided between the upper surface of the cartridge holder and the arm member so as to cross the opening.

The apparatus may further include a locking member that is operated by the at least one moving member, an engaged part may be provided on the chassis, and when the at least one moving member has moved to the second position, the locking member may be operated by the at least one moving member and the locking member and the engaged part engaging one another.

In addition, the apparatus may further include an additional moving member that is moved by the disc cartridge inserted into the cartridge holder and a spring that is provided between the additional moving member and the cartridge holder and is energized in a direction in which the disc cartridge is ejected from the cartridge holder.

Also, a locked part may be further provided on the cartridge holder, a locking part may be provided on the additional moving member, and the additional moving member may be moved by the disc cartridge inserted into the cartridge holder so that the locking part engages the locked part, thereby locking the cartridge holder.

In addition, the apparatus may include a lock releasing member, a lock release operating part may be provided on the additional moving member, the lock release operating part may contact the lock releasing member due to rotation of the cartridge holder, engagement of the locking part and the locked part may be released, and the additional moving member may be moved by the spring.

Also, the additional moving member may be provided in a movable state on the upper surface of the cartridge holder so as to overlap the at least one moving member.

In addition, the driving mechanism may include an engaging hook part that engages a driving source and the at least one moving member and is rotated by a driving force of the driving source, and the at least one moving member may be moved by rotating the engaging hook part during recording onto the magneto-optical disc.

Also, the driving mechanism may be provided, on a rotational base side of the cartridge holder, in a direction perpendicular to a direction in which the disc cartridge is inserted into the cartridge holder.

In addition, a positioning part that positions the disc cartridge may be further provided on the driving mechanism.

In addition, a recording/reproducing apparatus according to the present invention includes:

a chassis on which an optical pickup and a disc rotation driving part are provided;

a cartridge holder in which a disc cartridge, in which a magneto-optical disc that can be recorded or reproduced is enclosed in a rotatable state, is inserted and which holds the disc cartridge, the cartridge holder being attached to the chassis so as to be able to rotate between a loading position at which the magneto-optical disc inside the held disc cartridge is chucked onto the disc rotation driving part, and an eject position at which the disc cartridge is ejected;

a magnetic head that is disposed so as to face the optical pickup on an upper surface side of the cartridge holder and is moved via an opening between a lowered position inserted into the disc cartridge and close to the magneto-optical disc and a raised position away from the magneto-optical disc;

at least one moving member provided so as to be free to move on the cartridge holder at a side part parallel with a direction in which the disc cartridge is inserted into the cartridge holder;

a head raising/lowering mechanism that moves the magnetic head between the raised position and the lowered position by moving the at least one moving member in the direction of insertion of the disc cartridge; and a moving mechanism that is disposed on a lower surface side of the chassis, engages the at least one moving member, and moves the at least one moving member.

In addition, the apparatus may further include an arm member, on one end of which the magnetic head is provided, and another end of which is connected to the optical pickup so that the arm member can rotate between the raised position and the lowered position and the arm member has an approximately U-shaped cross section, the optical pickup may be supported on the chassis so as to be freely movable in a radial direction of the magneto-optical disc, and the arm member may be disposed so as to face the opening on an upper surface side of the disc cartridge.

Also, the head raising/lowering mechanism may include a raising/lowering operating part that lifts the arm member when the driving mechanism has moved the at least one moving member to a first position that has the magnetic head moved to the raised position, and releases support of the arm member when the at least one moving member has been moved to a second position that moves the magnetic head to the lowered position, and the raising/lowering operating part may be provided so as to protrude from the at least one moving member approximately perpendicular to a direction of movement of the at least one moving member.

In addition, the raising/lowering operating part may be provided between the upper surface of the cartridge holder and the arm member so as to cross the opening.

Also, the apparatus may further include a locking member that is operated by the at least one moving member, an engaged part may be provided on the chassis, and when the at least one moving member has moved to the second position, the locking member may be operated by the at least one moving member, and the locking member and the engaged part may engage one another.

In addition, the apparatus may further include an additional moving member that is moved by the disc cartridge inserted into the cartridge holder in a direction that is parallel with the direction of insertion of the disc cartridge, and a spring that is provided between the additional moving member and the cartridge holder and is energized in a direction in which the disc cartridge is ejected from the cartridge holder.

Also, a locked part may be further provided on the cartridge holder, a locking part may be provided on the additional moving member, and the additional moving member may be moved by the disc cartridge inserted into the cartridge holder so that the locking part engages the locked part, thereby locking the cartridge holder.

In addition, the apparatus may include a lock releasing member disposed on one side surface of the chassis, a lock release operating part may be further provided on the additional moving member, the lock release operating part may contact the lock releasing member due to rotation of the cartridge holder, engagement of the locking part and the locked part may be released, and the additional moving member may be moved by the spring.

Also, the additional moving member may be provided in a movable state on an upper surface of the cartridge holder so as to overlap the at least one moving member.

In addition, the driving mechanism may include an engaging hook part that engages a driving source and the at least one moving member and is rotated by a driving force of the driving source, and the at least one moving member may be moved by rotating the engaging hook part during recording onto the magneto-optical disc.

Also, the driving mechanism may be provided, on a rotational base side of the cartridge holder, in a direction perpendicular to the direction in which the disc cartridge is inserted into the cartridge holder.

BRIEF DESCRIPTION OF DRAWINGS

FIGS. 3A and 3B show a state where a head raising/lowering mechanism and an eject mechanism have been mounted on a recording/reproducing apparatus according to the present invention, with FIG. 3A being a plan view and FIG. 3B being a side view.

FIGS. 4A and 4B show a state where only a head raising/lowering mechanism has been mounted on the cartridge holder of the recording/reproducing apparatus according to the present invention and the first sliding member has been moved forwards, with FIG. 4A being a plan view and FIG. 4B being a side view.

FIGS. 6A and 6B show a state where only an eject mechanism has been mounted on the cartridge holder of the recording/reproducing apparatus according to the present invention and a second sliding member has been moved forwards, with FIG. 6A being a plan view and FIG. 6B being a side view.

FIGS. 7A and 7B show a state where only the eject mechanism is mounted on the cartridge holder of the recording/reproducing apparatus according to the present invention and the second sliding member has moved to the rear, with FIG. 7A being a plan view and FIG. 7B being a side view.

BEST MODE FOR CARRYING OUT THE INVENTION

Embodiments of the present invention are described below with reference to the attached drawings.

Figure 1:
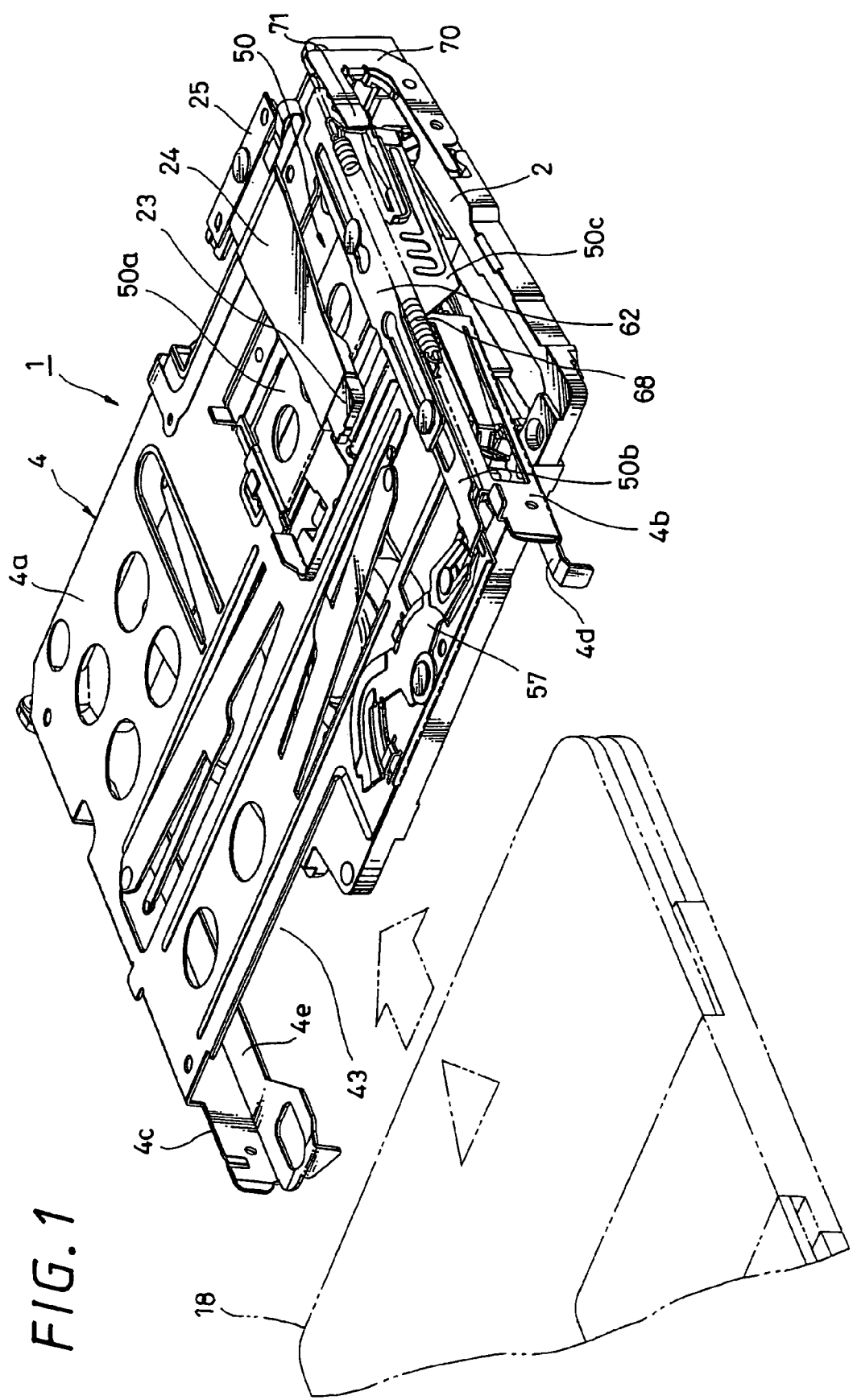
FIG. 1 is a perspective view showing an embodiment of the recording/reproducing apparatus according to the present invention, and shows a state where the cartridge holder has popped up and moved away from the mechanical deck chassis.
Figure 2:
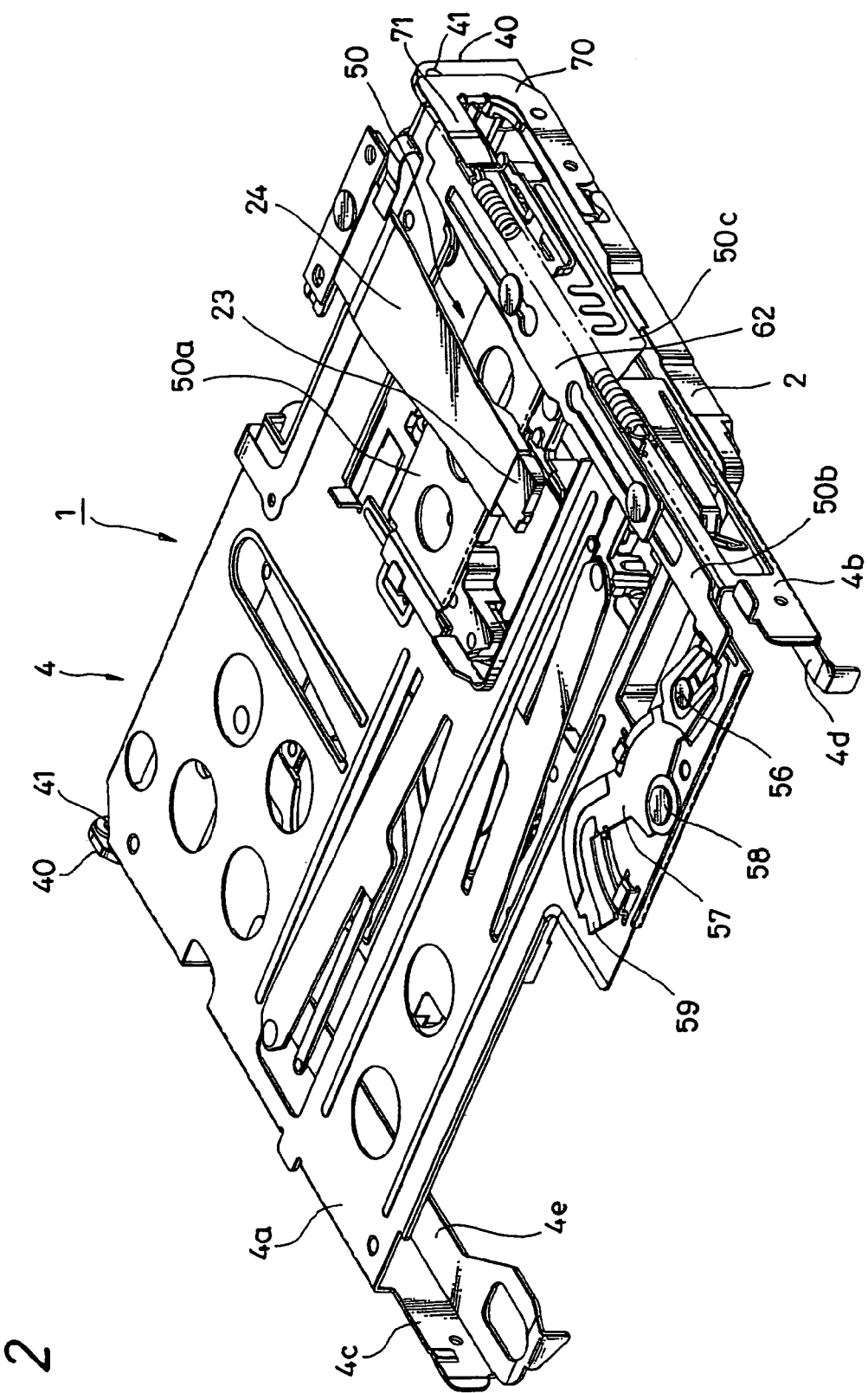
FIG. 2 is a perspective view showing the embodiment of the recording/reproducing apparatus according to the present invention, and shows a state where the cartridge holder is closed and overlaps the mechanical deck chassis.
Figure 9:
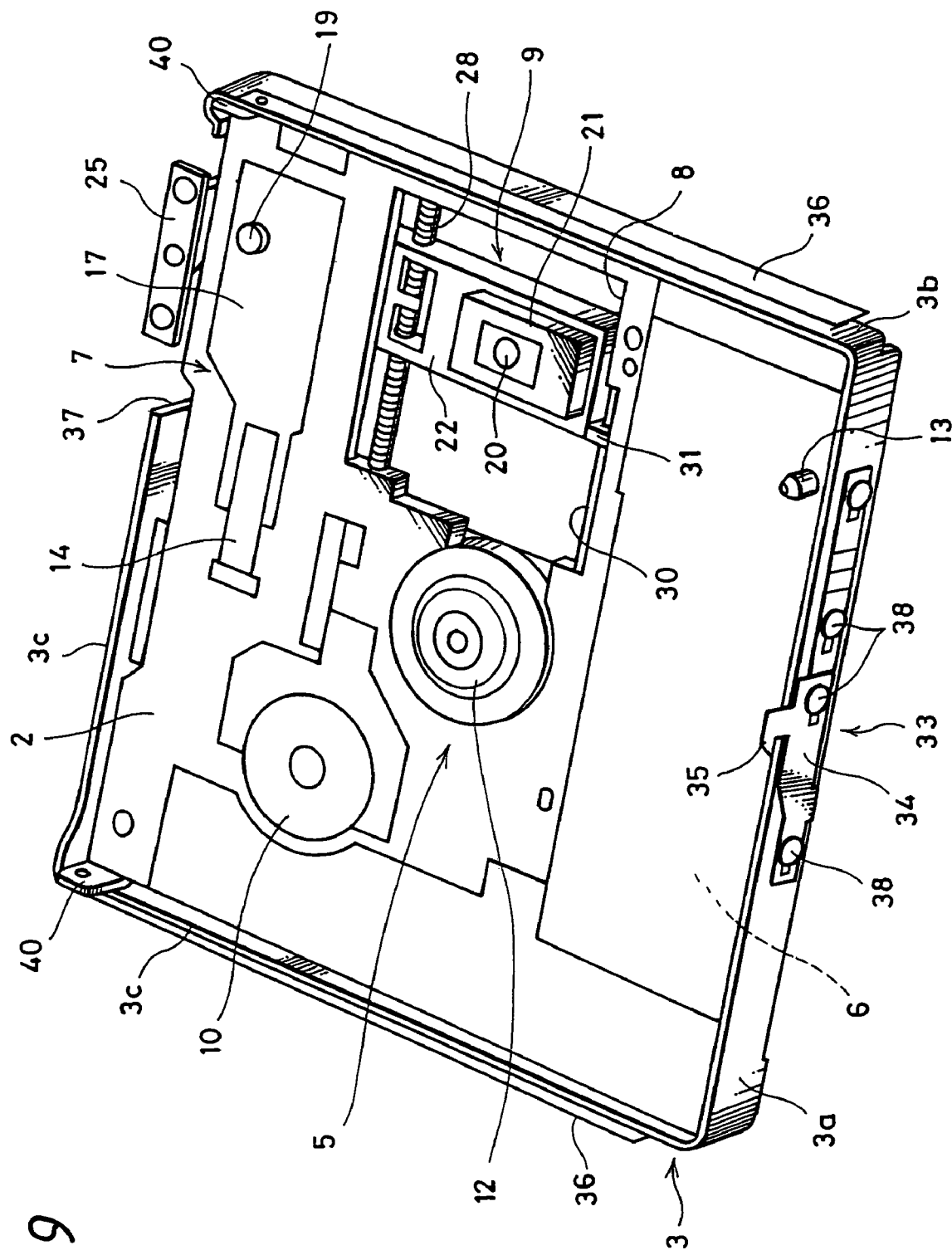
FIG. 9 is a perspective view showing the mechanical deck chassis and external frame of the recording/reproducing apparatus according to the present invention.

As shown in FIGS. 1, 2, and 9, a disc recording/reproducing apparatus 1 that is an embodiment of the present invention is composed of parts such as a mechanical deck chassis 2 in the form of a flat plate, an external frame 3 that surrounds an outer edge of the mechanical deck chassis 2, and a cartridge holder 4 that is attached so as to be freely elevatable with respect to the mechanical deck chassis 2. The mechanical deck chassis 2 is formed of engineering plastic with an appropriate strength and rigidity in an approximately rectangular shape, and a disc rotation mechanism 5 is mounted on an approximately central part thereof.

A battery enclosure 6 is provided on a front side of the mechanical deck chassis 2 and a head raising/lowering driving mechanism 7 is provided on a rear side thereof. In addition, an opening 8 that passes through the mechanical deck chassis 2 in an up/down direction is provided in one side of the mechanical deck chassis 2, that is, a right side of the mechanical deck chassis 2 when looking from the front side in FIG. 9. A pickup device 9 is movably attached to the mechanical deck chassis 2 in relation to the opening 8. In addition, a pickup moving motor 10 is attached on an opposite side of the mechanical deck chassis 2 to the opening 8.

Figure 10:
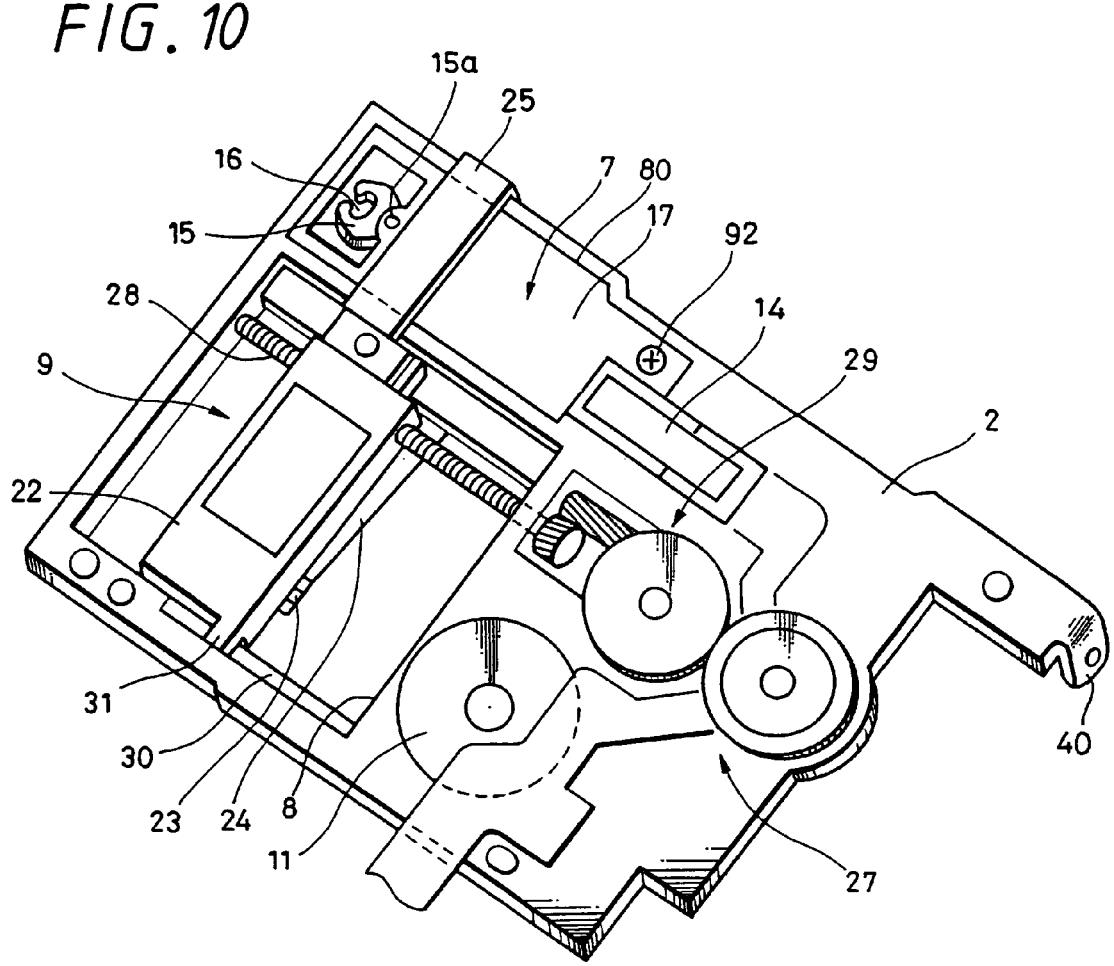
FIG. 10 is a perspective view showing a rear surface side of the mechanical deck chassis of the recording/reproducing apparatus according to the present invention.

As shown in FIGS. 9 and 10, the disc rotation mechanism 5 is composed of a disc driving motor 11 that is fixed to the mechanical deck chassis 2 and a turntable 12 that is fixed to a rotational shaft of the disc driving motor 11. An upper part of the turntable 12 projects upwards from an upper surface of the mechanical deck chassis 2. A magneto-optical disc that is enclosed within a disc cartridge that has been attached to the cartridge holder 4 is detachably attached to this turntable 12. It should be noted that reference numeral 13 designates a reference pin that acts as a reference for positioning a disc cartridge 18 at a predetermined position on the mechanical deck chassis 2.

The battery enclosure 6 is open at a lower surface of the mechanical deck chassis 2 and encloses a battery, not shown, for example a rectangular secondary cell, as a power source. The head raising/lowering driving mechanism 7 raises and lowers a recording head that is described later, and includes a driving motor 14 and an operation hook 15 that is rotated by the driving motor 14 so as to rotate in a horizontal direction within a range of a predetermined angle. The operation hook 15 is provided with an engaging recessed part 16 that is open on an opposite side to the driving motor 14. A positioning protruding part 19 that in concert with the reference pin 13 positions the disc cartridge 18 is provided on an upper surface of the case 17.

Figure 11:
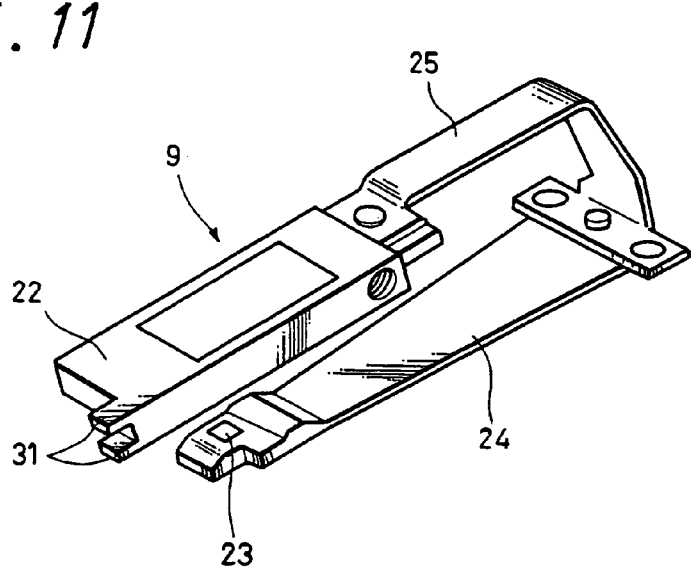
FIG. 11 is a perspective view showing a rear surface side of the optical pickup device of the recording/reproducing apparatus according to the present invention.

As shown in FIGS. 9 to 11, the pickup device 9 is composed of parts such as an optical pickup 21 that has an objective lens 20 provided so as to face upwards, a slider 22 on which the optical pickup 21 is mounted, a magnetic head 23 provided above and facing the optical pickup 21, a head arm 24 to whose tip the magnetic head 23 is attached via a gimbal spring, not shown, and a connecting member 25 that connects the head arm 24 and the slider 22 so that a cross-sectional form of the construction is approximately "U" shaped. The pickup device 9 is driven by a pickup driving mechanism 27 so as to move towards and away from the turntable 12, that is, so as to move in a radial direction of the magneto-optical disc enclosed within the disc cartridge 18.

As shown in FIGS. 9 and 10, the pickup driving mechanism 27 is composed of parts such as a feed screw shaft 28 that passes through and is free to slide in a shaft bearing hole provided in one side of the slider 22 in the longitudinal direction, the pickup moving motor 10 described above, and a transmission gear mechanism 29 that connects and can transmit power between the pickup moving motor 10 and the feed screw shaft 28. Both ends of the feed screw shaft 28 are rotatably supported on the mechanical deck chassis 2. A guide bearing 31 that can slidably engage a guide part 30 provided on the mechanical deck chassis 2 is provided at the other end of the slider 22. By driving the pickup driving mechanism 27, the slider 22 is guided by the guide bearing 31 and the feed screw shaft 28 and moved in a straight line. As a result, as described above the optical pickup 21 and the magnetic head 23 of the pickup device 9 are moved in the radial direction.

As shown in FIG. 9, the external frame 3 that surrounds the outside of the mechanical deck chassis 2 forms a rectangular frame, with a cover locking mechanism 33 being provided in an approximately central part of a front surface part 3a thereof. The cover locking mechanism 33 is composed of a sliding member 34, which is held by a plurality of guide pins 38 provided on the front surface part 3a so as to be free to slide horizontally, and a spring member, not shown, that constantly energizes one side of the sliding member 34. A hook part 35 that protrudes on a side on which the energizing force of the spring member acts is provided on an upper part of the sliding member 34. Support levers 36, 36 for supporting a cover, not shown, that covers an upper surface of the cartridge holder are attached to both side surface parts 3b, 3c of the external frame 3 and can be freely elevated. A cutaway part 37 for avoiding interference with the connecting member 25 is provided in a rear surface part 3d of the external frame 3.

A pair of shaft bearing arms 40, 40 for supporting the cartridge holder 4 so as to be freely elevatable is provided on both sides of a rear part of the mechanical deck chassis 2 so as to project upwards. Corresponding to this pair of shaft bearing arms 40, 40, a pair of rotational shaft parts 41, 41 is provided on the cartridge holder 4. By having these rotational shaft parts 41, 41 rotatably supported with the pair of shaft bearing arms 40, 40, the cartridge holder 4 is constructed so as to be elevatable in an up-down direction with respect to the mechanical deck chassis 2. That is, the cartridge holder 4 chucks the magneto-optical disc within the held disc cartridge 18 onto the turntable 12 and rotates between a loading position where recording and reproduction can be carried out for the magneto-optical disc and an eject position where the disc cartridge 18 is ejected.

As shown in FIGS. 1 to 7, the cartridge holder 4 has a flat surface part 4a that is approximately rectangular and slightly larger than the disc cartridge 18, side surface parts 4b, 4c that are continuous with both sides of the flat surface part 4a, and base surface parts 4d, 4e that are continuous with lower parts of the respective side surface parts 4b, 4c and protrude inwards. The space enclosed by the flat surface part 4a, the side surface parts 4b, 4c, and the base surface parts 4d, 4e composes a cartridge enclosure 43 for holding the disc cartridge 18. The disc cartridge 18 inserted into this cartridge enclosure 43 is supported from below by the base surface parts 4d, 4e on the left and right sides.

The disc cartridge 18, part of which is shown in FIG. 1, is a conventionally known structure, and is therefor described only in brief here. That is, the disc cartridge 18 includes a cartridge case that is formed by placing upper and lower halves on top of one another, with a magneto-optical disc as a disc-like recording medium being rotatably enclosed inside this cartridge case. Openings for exposing part of the magneto-optical disc to the outside are provided in upper and lower surfaces of the cartridge case, with these openings being opened and closed by a shutter member.

A first opening 44 into and out of which the magnetic head 23 of the pickup device 9 is moved is provided at one end on one side of the flat surface part 4a of the cartridge holder 4 corresponding to an opening in the disc cartridge. The first opening 44 is formed with a size that allows the magnetic head 23, which moves together with the optical pickup 21, to move in the radial direction of the magneto-optical disc enclosed within the disc cartridge 18. A second opening 45 for avoiding interference with a locking lever and a part connected to a first sliding member 50, described later, is provided in a front part of one side of the flat surface part 4a. The magnetic head 23 that is supported on the tip of the head arm 24 by a gimbal spring, not shown, is inserted into the first opening 44 from above. To support the magnetic head 23 from below, the first sliding member 50 is attached to the cartridge holder 4 so as to be slidable in a front-rear direction.

As shown in FIGS. 4A, 4B and 5A, 5B, the first sliding member 50 includes a raising/lowering operation part 50a provided so as to protrude approximately perpendicular to a direction of movement of the first sliding member 50 across the first opening 44 in a widthwise direction, a plate-like part 50b that is provided so as to extend towards the front from one side of the raising/lowering operation part 50a, and a side surface operated part 50c that is continuous with an opposite side of the plate-like part 50b to the raising/lowering operation part 50a and faces an outside of the side surface part 4b of the cartridge holder 4. An engaging arm 51 that engages the engaging recessed part 16 of the operation hook 15 is provided on a rear end of the side surface operated part 50c. This engaging arm 51 is provided so as to extend downwards at an angle with respect to a horizontal state of the first sliding member 50. As a result, even when the cartridge holder 4 has been popped upwards, the engagement of the engaging arm 51 inside the engaging recessed part 16 is maintained.

Also, as shown in FIGS. 12A, 12B and 13A, 13B, in a central part of the side surface operated part 50c, there is provided a locking stepped part 65 for locking a second sliding member 62, described later, at a predetermined position on the cartridge holder 4, that is, a set position for attaching the disc cartridge 18 to the turntable 12. A tapered guide part 66 for gently guiding the second sliding member 62 is provided in a front side of the locking stepped part 65.

Figures 5A, 5B:
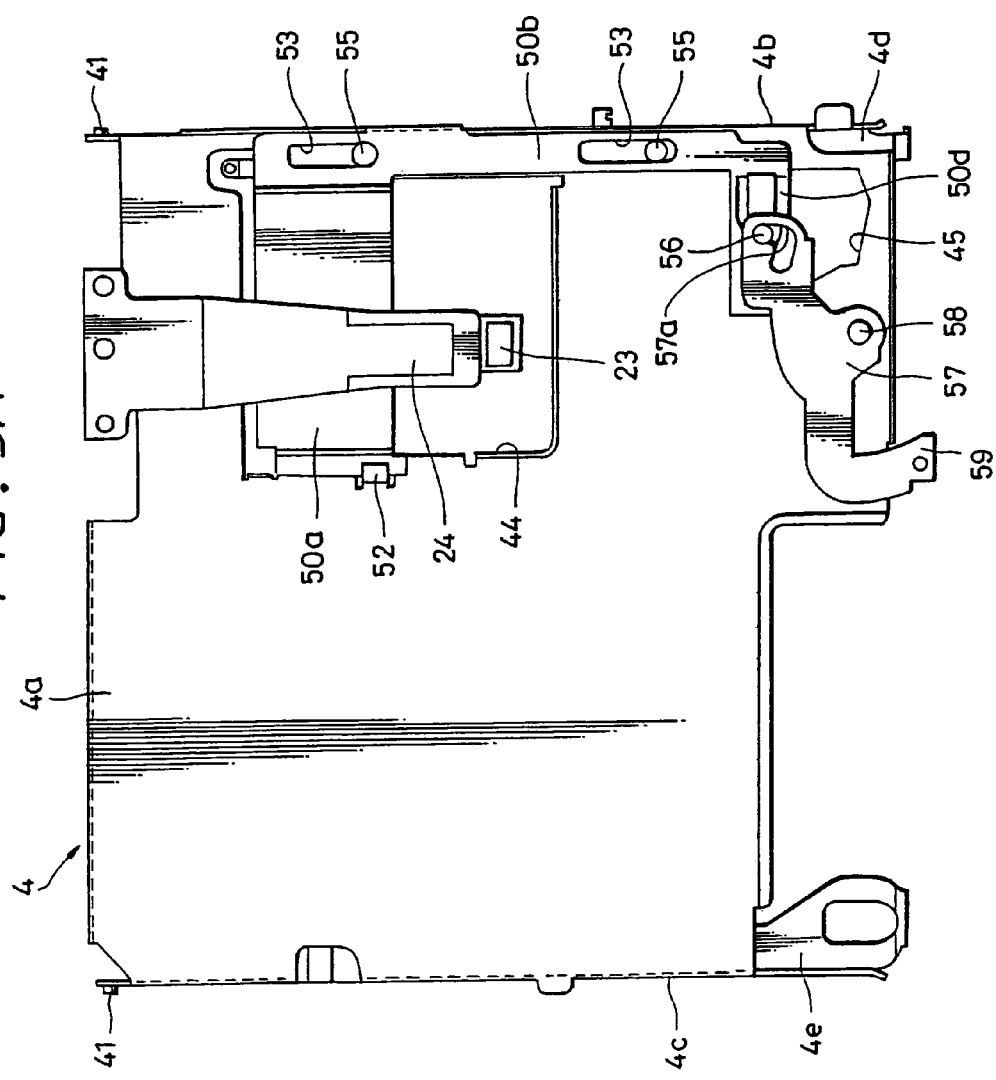
FIGS. 5A and 5B show a state where only a head raising/lowering mechanism has been mounted on the cartridge holder of the recording/reproducing apparatus according to the present invention and the first sliding member has been moved backwards, with FIG. 5A being a plan view and FIG. 5B being a side view.

When moved towards the front to the position shown in FIG. 4A, the raising/lowering operation part 50a of the first sliding member 50 raises the head arm 24 on which the magnetic head 23 is provided from below to move the magnetic head 23 away from the magneto-optical disc. When the raising/lowering operation part 50a has moved from a position shown in FIG. 4A to the rear as shown in FIG. 5A, the raising/lowering operation part 50a becomes separated from the head arm 24 so that the magnetic head 23 is placed in a free state where the magnetic head 23 is supported by only the gimbal spring, not shown, and as shown in FIG. 5B, is inserted via the first opening 44 and an opening in the disc cartridge 18 so as to be placed in sliding contact with the magneto-optical disc. In this state, the laser light from the optical pickup 21 is focused onto the magneto-optical disc by the objective lens 20 so as to irradiate the disc so that data is recorded in accordance with a perpendicular magnetic field supplied from the magnetic head 23. To ensure that the raising/lowering operation part 50a operates horizontally, the side end of the raising/lowering operation part 50a is inserted so as to be slidable between a rim part of the first opening 44 and a holding arm 52 provided in one part thereof.

Two guide grooves 53, 53 that extend in the front-rear direction are provided in the plate-like part 50b of the first sliding member 50 with a predetermined gap in between. These guide grooves 53, 53 are respectively engaged in a slidable manner by guide shafts 55, 55 that are fixed to the cartridge holder 4. In addition, a connecting part 50d that projects on the raising/lowering operation part 50a side is provided at a front end of the plate-like part 50b. An axle 56 for allowing a locking lever 57 to rotate is fixed to this connecting part 50d.

The locking lever 57 is rotatably supported on an upper surface of the flat surface part 4a by a support axle 58 fixed to the cartridge holder 4. A locking hook 59 that protrudes forwards is integrally provided on an opposite side of the locking lever 57 to the axle 56. By having this locking hook 59 project forwards as shown in FIG. 5A to engage the hook part 35 of the sliding member 34 described above, it is possible to lock a cover, not shown, so that the cover can no longer be opened.

The first sliding member 50 described above composes a head raising/lowering mechanism 60 that raises and lowers the magnetic head 23 in order to carry out recording of an information signal on the magneto-optical disc enclosed in the disc cartridge 18. The sliding member 34 and the locking lever 57 compose a cover locking mechanism that locks a cover, not shown, in a closed state.

Below the plate-like part 50b of the first sliding member 50, the second sliding member 62 is attached to the cartridge holder 4 so as to be freely slidable in the front-rear direction. As shown in FIGS. 6A, 6B and FIGS. 7A, 7B, the second sliding member 62 includes a plate-like part 62a provided so as to extend forwards, a locking part 62b that faces the side surface part 4b of the cartridge holder 4 by extending continuously on one side at a rear of the plate-like part 62a, and a positioning part 62c that is continuous with a lower part of the locking part 62b and extends inwards.

Figure 12A:
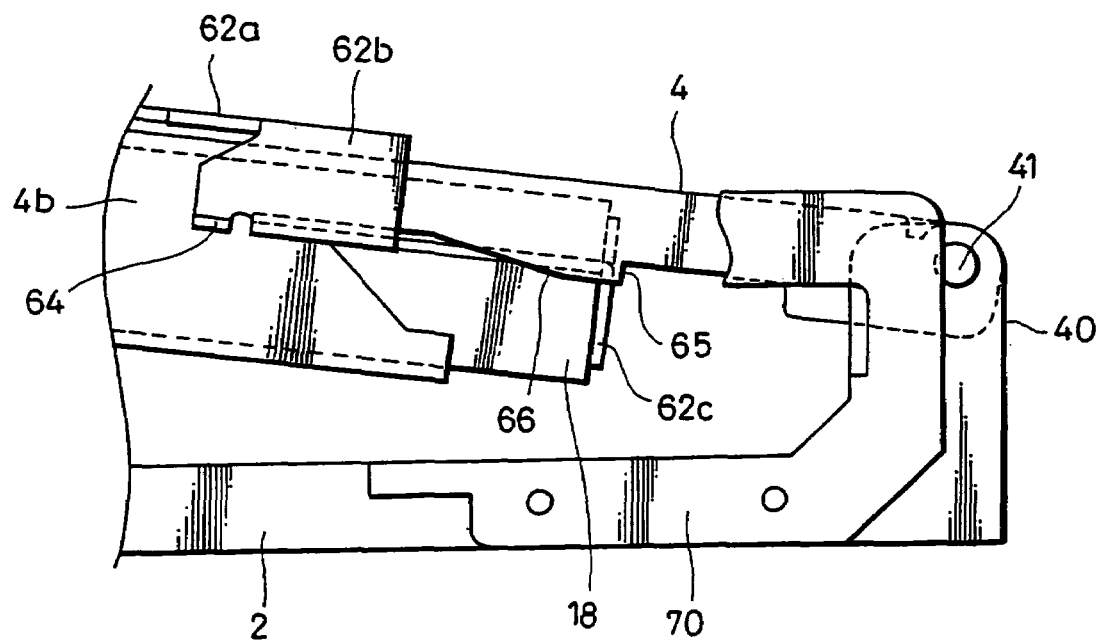
FIGS. 12A and 12B are diagrams useful in explaining the operation of the eject mechanism of the recording/reproducing apparatus according to the present invention, with FIG. 12A showing a state where the cover is opened before the eject mechanism is locked and FIG. 12B showing the state where the cover is opened and the eject mechanism has been locked.

This locking part 62b of the second sliding member 62 can freely engage the locking stepped part 65 of the cartridge holder 4 in an assembled state. In addition, a lock releasing protrusion 64 that protrudes sideways to the outside as shown in FIG. 12A is provided on the plate-like part 62a. Corresponding to this lock releasing protrusion 64, a lock releasing lever 70 is attached to one side part of the mechanical deck chassis 2. As shown in FIG. 1 and FIG. 12A, the lock releasing lever 70 is formed with a U-shaped planar form. One side part of the lock releasing lever 70 is fixed to the mechanical deck chassis 2 by a fixing means such as a fixing screw, and the other side part that is approximately parallel with this faces above the lock releasing protrusion 64 as a release operating part 71.

Figure 12B:
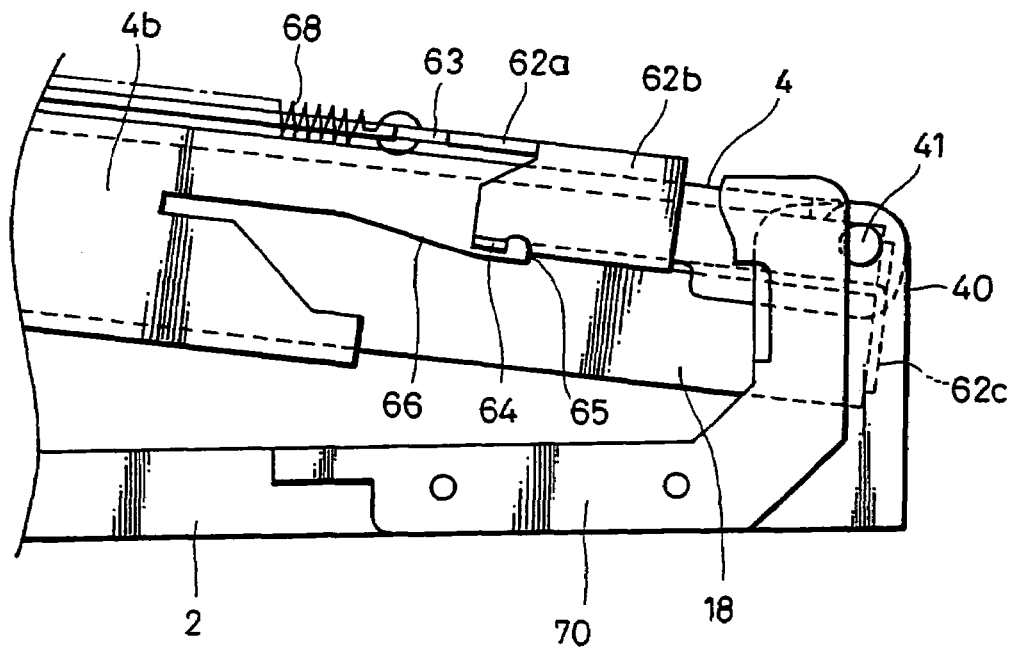
Figure 13A:
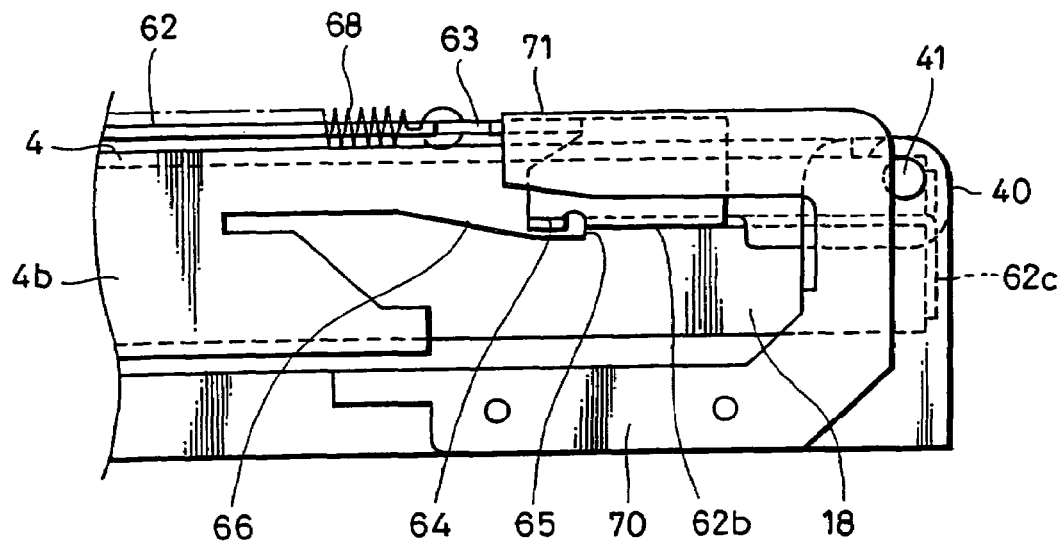
FIGS. 13A and 13B are diagrams useful in explaining the operation of the eject mechanism of the recording/reproducing apparatus according to the present invention, with FIG. 13A showing a state where the cover is closed and the eject mechanism has been locked and FIG. 12B showing the state where the cover is opened and the eject mechanism is locked.
Figure 13B:
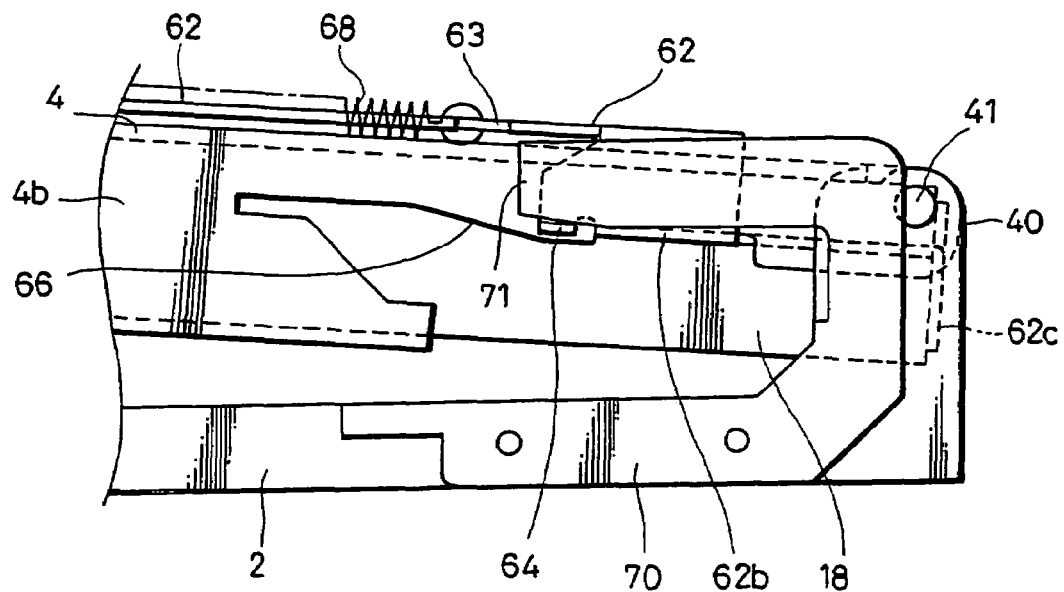

As shown in FIGS. 7A and 12B, the positioning part 62c extends towards an inside of the cartridge holder 4 so as to protrude on a movement locus of the disc cartridge 18 and positions the disc cartridge 18 inserted in the cartridge holder 4 in an insertion depth direction. In addition, a spring suspending arm 63 for engaging one end of a coil spring 68, which is one example of an elastic member, is provided on the second sliding member 62 at a position closer to the front than the locking part 62b of the plate-like part 62a. The other end of the coil spring 68 engages a spring suspending arm 72 provided on the cartridge holder 4.

In addition, two guide grooves 73, 73 that extend in the front-rear direction and are wider than the guide grooves 53, 53 are provided with a predetermined gap in between in the front-rear direction in the plate-like part 62a of the second sliding member 62. These guide grooves 73, 73 are respectively and slidably engaged by the guide shafts 55, 55 described above that are fixed to the cartridge holder 4. These guide shafts 55, 55 are constructed so that movement of the first sliding member 50 and the second sliding member 62 is not hindered by friction and the like produced by contact between the plate-like part 50b and the plate-like part 62a that are disposed on top of one another.

Figure 8:
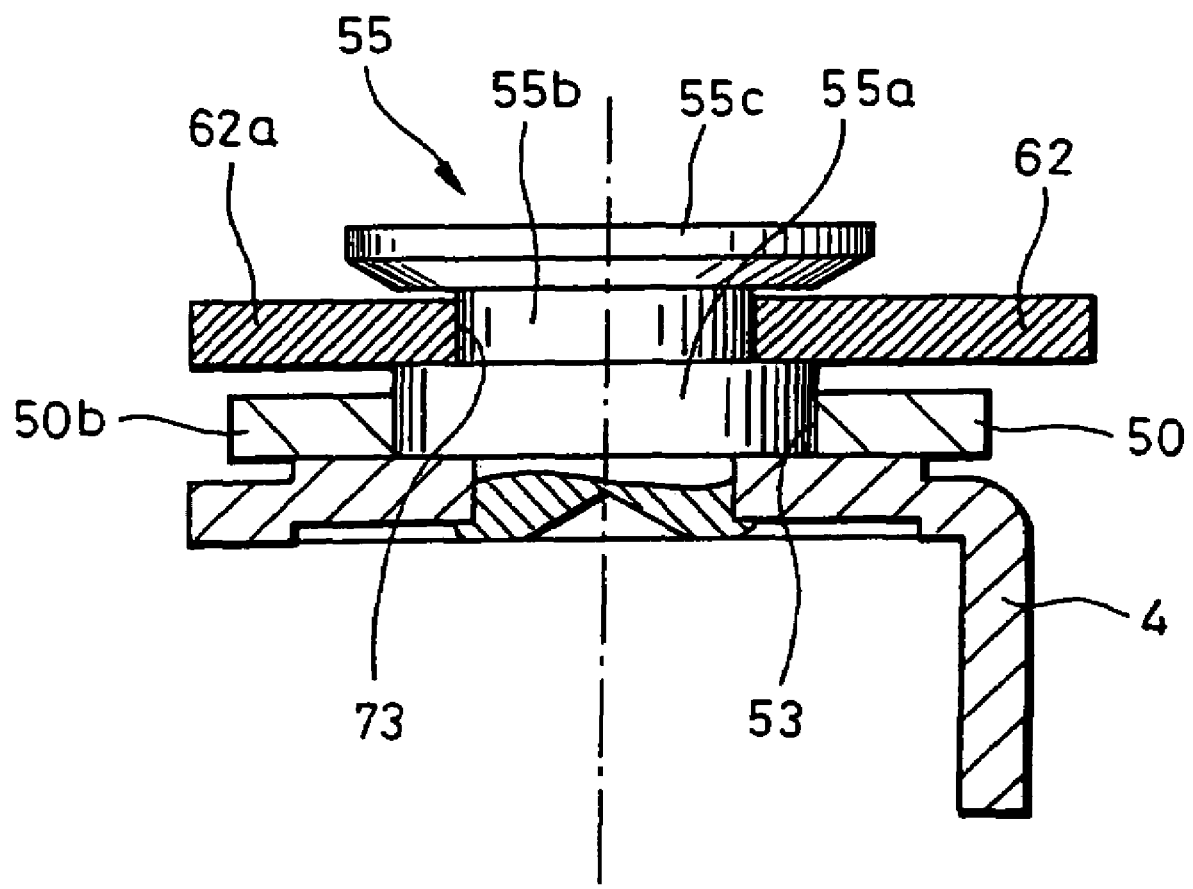
FIG. 8 is a cross-sectional view showing an enlargement of a part along the line X-X in FIG. 3.

That is, as shown in FIG. 8, the guide shafts 55, 55 respectively include a large diameter part 55a on the lower side, a small diameter part 55b that is continuous with an upper side of the large diameter part 55a and has a smaller diameter than the large diameter part 55a, and a flange part 55c provided above the small diameter part 55b. The guide grooves 53 provided in the plate-like part 50b are slidably engaged by the large diameter parts 55a, and the guide grooves 73 provided in the plate-like part 62a of the second sliding member 62 are slidably engaged by the small diameter parts 55b. Additionally, by making the length in the axial direction of the small diameter part 55b greater than the thickness of the plate-like part 50b, a gap is provided between the first sliding member 50 and the second sliding member 62, so that the upper and lower plate-like parts 50b and 62a do not contact one another.

As shown in FIG. 1, the second sliding member 62 is disposed above the first sliding member 50, so that the front end of the side surface operated part 50c of the first sliding member 50 extends below the positioning part 62c of the second sliding member 62. The locking part 62b, which is always energized towards the front by the spring force of the coil spring 68 disposed in an elongated state between a spring suspending arm 63 of the second sliding member 62 and the spring suspending arm 72 of the cartridge holder 4, engages a rear part of the side surface operated part 50c of the first sliding member 50 in a free state. This means that due to the force acting upon the second sliding member 62, the first sliding member 50 is also simultaneously energized towards the front.

On the other hand, when the first sliding member 50 has been moved to the rear, the side surface operated part 50c engages a front side of the locking part 62b of the second sliding member 62, so that both sliding members 50, 62 integrally move towards the rear.

The disc recording/reproducing apparatus 1 with the above construction can be simply assembled as described below, for example. First, the disc rotation mechanism 5, the pickup device 9, the pickup driving mechanism 27, and the other required mechanisms and devices are mounted onto the mechanical deck chassis 2. The first sliding member 50, the second sliding member 62, and the locking lever 57 are attached to the cartridge holder 4. It should be noted that the locking lever 57 is assembled in advance on the cartridge holder 4 by a crimping process or the like.

The first sliding member 50 and the second sliding member 62 can be assembled with respect to the cartridge holder 4 as described below, for example. First, the first sliding member 50 is placed over a right shoulder part of the cartridge holder 4. At this time, a front tip of the raising/lowering operation part 50a that is suspended over the first opening 44 is inserted between a rim of the flat surface part 4a of the cartridge holder 4 and the holding arm 52. At the same time or thereabouts, the axle 56 provided on the connecting part 50d that is continuous with the front tip of the plate-like part 50b engages a cam groove 57a formed on an opposite side of the locking lever 57 to the locking hook 59.

Next, the plate-like part 62a of the second sliding member 62 is placed over the plate-like part 50b of the first sliding member 50. By doing so, one side surface part 4b of the cartridge holder 4 ends up facing the side surface operated part 50c of the first sliding member 50 and simultaneously also facing the locking part 62b of the second sliding member 62. The locking part 62b faces the rear of the side surface operated part 50c. In this state, the guide shafts 55 are passed through the guide grooves 73 provided in the plate-like part 62a of the second sliding member 62, the guide grooves 53 provided in the plate-like part 50b of the first sliding member 50, and holes in the cartridge holder 4, and the insides are attached by crimping. By doing so, the attachment of the first and second sliding members 50, 62 to the cartridge holder 4 is completed.

Next, the cartridge holder 4, to which both sliding members 50, 62 have been attached, is attached to the mechanical deck chassis 2. This attachment process can be carried out by having the pair of rotational shaft parts 41, 41 provided on both sides at the rear of the cartridge holder 4 engage the shaft bearing arms 40, 40 provided on both sides at the rear of the mechanical deck chassis 2. At this time, the first sliding member 50 side of the cartridge holder 4 is passed under the head arm 24 of the pickup device 9 so that the magnetic head 23 supported on the front end of the head arm 24 is positioned so as to overlook the first opening 44. The release operating part 71 of the lock releasing lever 70 fixed to the mechanical deck chassis 2 is positioned facing an outside of the locking part 62b. By doing so, the cartridge holder 4 is assembled on the mechanical deck chassis 2, thereby completing the assembly process for the disc recording/reproducing apparatus 1.

The external frame 3 is attached to the disc recording/reproducing apparatus 1 which is then enclosed in an external case, not shown, and the cover is attached to the external frame 3. In this way, the disc recording/reproducing apparatus 1 is covered with a case so that it can be provided as a commercial disc recording/reproducing apparatus.

Next, an operation for inserting and ejecting the disc cartridge 18 into and from the disc recording/reproducing apparatus 1, etc., will be described. FIG. 1 shows a state where the cartridge holder 4 has been popped upwards from the mechanical deck chassis 2, with the disc cartridge 18 being inserted into the cartridge holder 4 in this state. As shown in the drawing, when the disc cartridge 18 is pressed into the cartridge enclosure 43 from a cartridge insertion hole of the cartridge holder 4, a shutter member provided on the disc cartridge 18 is moved by a shutter opening/closing mechanism, not shown, provided inside the cartridge holder 4 and the opening starts to become open.

At the same time, a front end surface of the insertion side of the disc cartridge 18 contacts the positioning part 62c provided on the second sliding member 62. In this case, the second sliding member 62 is always energized in a forward direction by the coil spring 68, but if the disc cartridge 18 is pushed in further against this energizing force, it is possible to move the second sliding member 62 towards the rear. At this time, the first sliding member 50 remains in a motionless state, so that the magnetic head 23 remains in a state where the head arm 24 has been raised from below by the raising/lowering operation part 50a, as shown in FIG. 4B.

In addition, as the disc cartridge 18 is inserted more deeply, the positioning part 62c is guided by the tapered guide part 66 provided on the side surface part 4b of the cartridge holder 4 and so is pushed slightly downwards, with the locking part 62b passing beyond the lowest end of the tapered guide part 66. As a result, the state changes from that shown in FIG. 12A to that shown in FIG. 12B, with the locking part 62b engaging the locking stepped part 65 and thereby placing the cartridge holder 4 in a locked state. In this way, the disc cartridge 18 is held at a predetermined position in the cartridge holder 4.

In this state, by pressing the cartridge holder 4 onto the mechanical deck chassis 2, the magneto-optical disc enclosed inside the disc cartridge 18 held in the cartridge holder 4 is attached to the turntable 12 of the disc rotation mechanism 5 disposed in an approximately central part of the mechanical deck chassis 2, thereby completing the chucking. As a result, a reproduction operation for an information signal can be carried out for the magneto-optical disc by the optical pickup 21 of the pickup device 9.

If a recording operation for an information signal is selected following the chucked state of the optical disc, the head raising/lowering mechanism 60 operates and the first sliding member 50 is moved towards the rear. At this time, if the first sliding member 50 moves towards the rear, the raising/lowering operation part 50a integrally formed with the first sliding member 50 moves towards the rear as shown in FIG. 5A, so that the supporting of the head arm 24, on which the magnetic head 23 is provided, by the raising/lowering operation part 50a is released, thereby placing the head arm 24 in a free state. As a result, due to the head arm 24 supporting the magnetic head 23 and the elasticity of the gimbal spring, not shown, itself, as shown in FIG. 5B the magnetic head 23 is inserted inside the disc cartridge 18 via the first opening 44 and the opening in the disc cartridge 18, so that the magnetic head 23 is moved to a position in sliding contact with or close to the surface of the magneto-optical disc.

At this time, the locking lever 57 is rotated in concert with movement of the first sliding member 50 to the rear, and as shown in FIG. 5A the locking hook 59 is thrust forwards. As a result, the locking hook 59 engages the hook part 35 of the sliding member 34 that is attached to the external frame 3, thereby placing the first sliding member 50 in a locked state. By doing so, it is possible to prevent the cover, not shown, from becoming open. By doing so, it becomes possible to reliably carry out recording of an information signal on the magneto-optical disc, and an unintentional opening of the cover during a recording operation on the magneto-optical disc and damage to the pickup device 9, damage to the disc, and the like can be prevented.

Next, an eject operation for the disc cartridge 18 will be described. When the cover is opened, such as when the recording or reproduction of an information signal on the optical disc is complete, first the cover locking mechanism that locks the cover is released. The first sliding member 50 moves to the position shown in FIG. 4A, so that the locking of the locking lever 57 by the hook part 35 is released, and it becomes possible for the first sliding member 50 to move in the front-rear direction. At this time, the raising/lowering operation part 50a is also moved to the position shown in FIG. 4A, so that the magnetic head 23 is moved to the position shown in FIG. 4B. For this reason, when the cover is opened, the cartridge holder 4 is rotated from the state shown in FIG. 13A to that shown in FIG. 13B, and the lock releasing protrusion 64 provided on the locking part 62b of the second sliding member 62 contacts the release operating part 71 of the lock releasing lever 70 from below. In this way, the locking part 62b is pressed downwards, so that the locking part 62b is taken off the locking stepped part 65 so that the locking of the second sliding member 62 is released.

As a result, the second sliding member 62 is pulled forward by the tension of the coil spring 68. By doing so, the side surface operated part 50c of the first sliding member 50 is pressed forward by the locking part 62b of the second sliding member 62, so that the first sliding member 50 moves forward. As a result, the state changes from that shown in FIG. 13B to that shown in FIG. 12A, the disc cartridge 18 is pressed forwards by the second sliding member 62, and the disc cartridge 18 is ejected from the cartridge holder 4. By doing so, the cover is placed in an opened state, so that the disc cartridge 18 pressed out of the cartridge holder 4 can be removed.

According to the disc recording/reproducing apparatus 1 described above, a construction is used in which two mechanisms, i.e., the head raising/lowering mechanism 60 and the eject mechanism, are disposed on top of one another at the same position, so that two mechanisms are disposed compactly at a position that was merely dead space in the conventional apparatus. Accordingly, it is possible to make common use of components, and it is also possible to miniaturize the apparatus, so that the substrates, cabinets, and the like can be freely laid out in other areas.

Next, the head raising/lowering driving mechanism 7 for operating the head raising/lowering mechanism 60 to raise and lower the magnetic head 23 in the disc recording/reproducing apparatus 1 of the present embodiment will be described in detail.

As shown in FIGS. 9 and 10, this head raising/lowering driving mechanism 7 is provided on the mechanical deck chassis 2 side, and is constructed so as to include the driving motor 14 that is the driving source of the head raising/lowering mechanism 60 and the operation hook 15 that is rotated by being driven by this driving motor 14. The operation hook 15 rotates within a range of a predetermined angle with the shaft 15a as a support, and the operating direction thereof corresponds to the sliding direction of the first sliding member 50 of the head raising/lowering mechanism 60.

Figure 14:
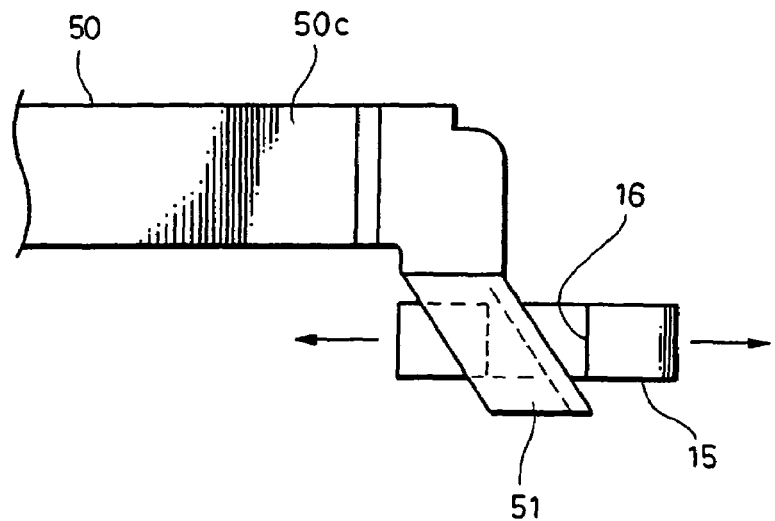
FIG. 14 is a diagram useful in explaining the engagement relationship between an operation hook and an engagement arm in the recording/reproducing apparatus according to the present invention.

This operation hook 15 is formed with the engaging recessed part 16, with the engaging arm 51 provided on the rear end part of the side surface operated part 50c of the first sliding member 50 engaging this engaging recessed part 16 (see FIG. 14).

With this construction, since the head raising/lowering mechanism 60 and the head raising/lowering driving mechanism 7 are operatively linked, that is, when the driving motor 14 of the head raising/lowering driving mechanism 7 is driven and the operation hook 15 is rotated with the shaft 15a as a support, coupled with this the first sliding member 50 of the head raising/lowering mechanism 60 slides in the front-rear direction, which results in the magnetic head 23 being raised and lowered between a position shown in FIG. 5B close to or in sliding contact with one surface of the magneto-optical disc, that is, a "lowered position", and a position shown in FIG. 4B away from the magneto-optical disc, that is, a "raised position".

Figure 15:
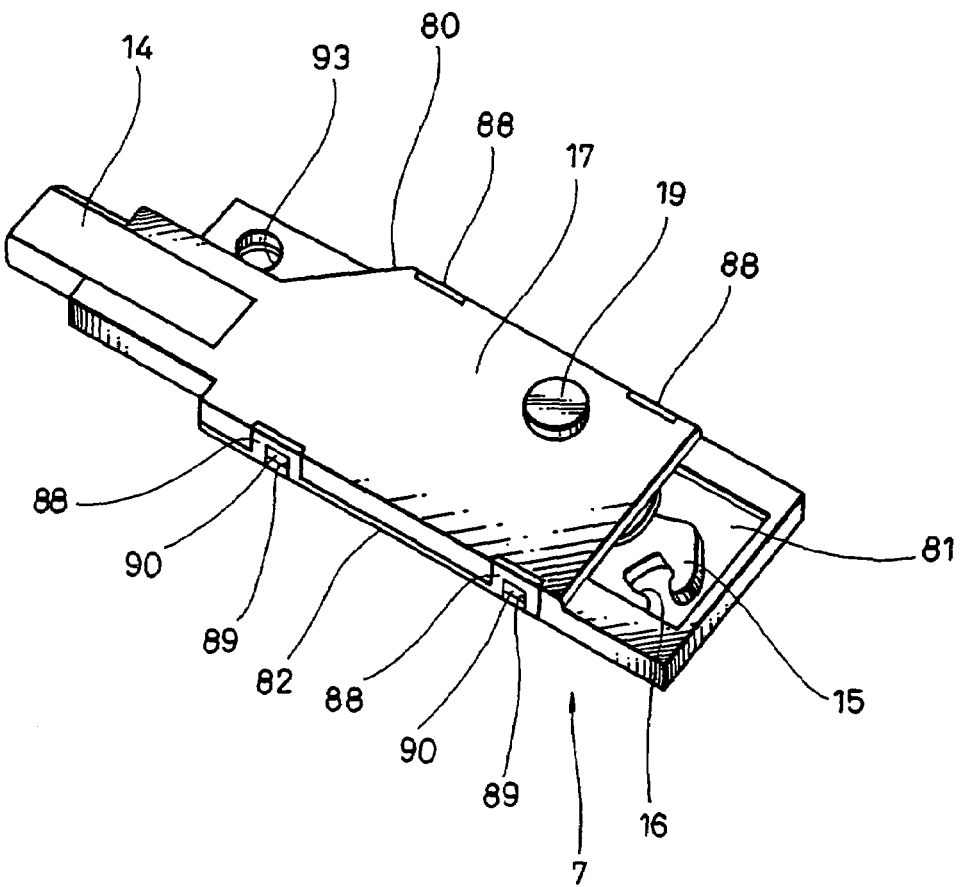
FIG. 15 is a perspective view showing a unit of a head raising/lowering driving mechanism of the recording/reproducing apparatus according to the present invention.

The head raising/lowering driving mechanism 7 is unitized and provided as a single assembly, as shown in FIG. 15.

Figure 16:
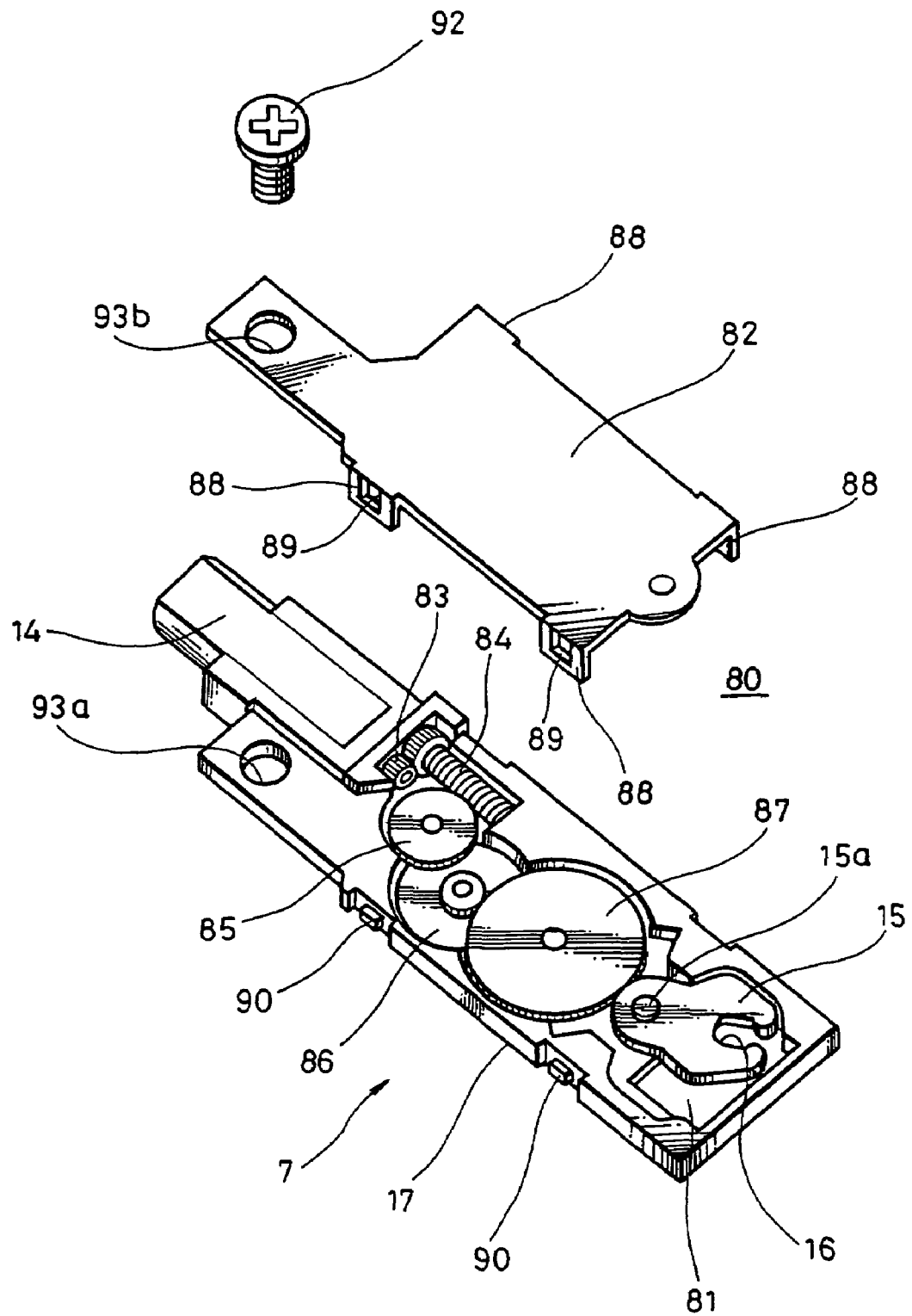
FIG. 16 is an exploded perspective view showing a state where the cover of the unit shown in FIG. 15 has been removed.

In a unit 80 of the head raising/lowering driving mechanism 7, the driving motor 14 that is the driving source is fixed to one end of the case 17 and the operation hook 15 is exposed from an opening 81 at the other end. In a part covered by a cover plate 82 in the central part of the case 17, a plurality of gears 83, 84, 85, 86, 87 are enclosed as shown in FIG. 16 as a driving force transmission mechanism, with the driving force of the driving motor 14 being decelerated by these gears 83, 84, 85, 86, 87 and transmitted to the operation hook 15, so that the operation hook 15 is rotated with increased torque and applies a sufficient driving force for the head raising/lowering mechanism 60.

In this unit 80, the cover plate 82 that covers the central part of the case 17 includes four leg parts 88 that are arranged with two on each side, with engaging holes 89 formed in these four leg parts 88 engaging protrusions 90 provided on the side surfaces of the case 17, thereby fixing the cover plate 82 to the case 17.

Figure 17:
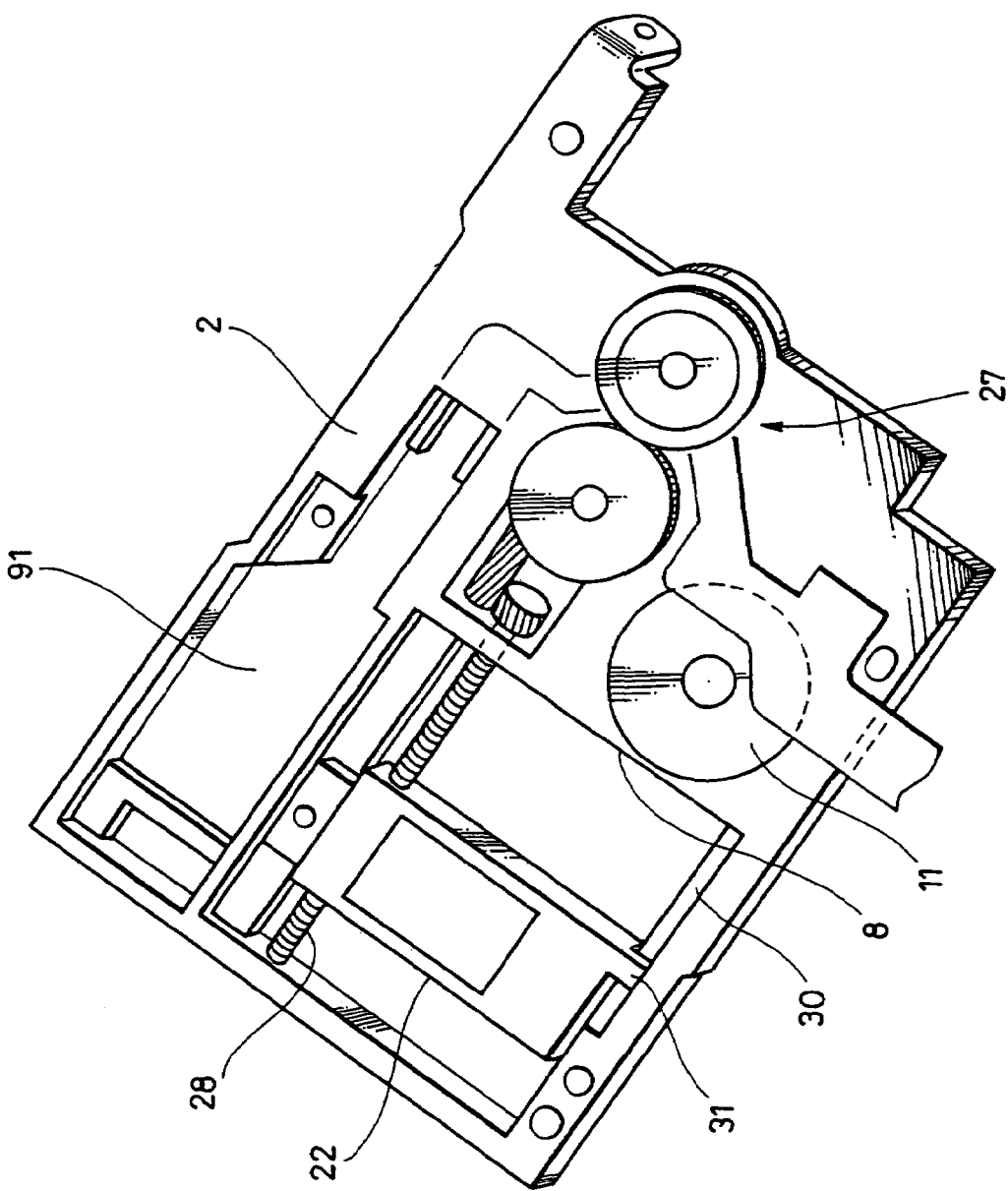
FIG. 17 is a perspective view showing the mechanical deck chassis 2 into which the unit shown in FIG. 15 is mounted.

The unit 80 of the head raising/lowering driving mechanism 7 is formed with the same thickness as the mechanical deck chassis 2, and this unit 80 is mounted so as to be enclosed within the mechanical deck chassis 2. As shown in FIG. 17, a hole 91 corresponding to the external form of the unit 80 is formed in the mechanical deck chassis 2, and the unit 80 is fitted into this hole 91 from the lower surface side of the mechanical deck chassis 2 without leaving any gaps, thereby integrating the unit 80 with the mechanical deck chassis 2.

Here, in particular in the disc recording/reproducing apparatus 1 according to the present embodiment, the part in which the unit 80 of the head raising/lowering driving mechanism 7 is mounted is behind the pickup device 9 and is provided in a space corresponding to the connecting member 25 that connects the optical pickup 21 of the pickup device 9 and the head arm 24 on which the magnetic head 23 is provided.

Due to the relationship between the strength of a conventional mechanical deck chassis and its dimensions, this part has hitherto been dead space, so that by disposing the head raising/lowering driving mechanism 7 in this space, more efficient use of space is made in the apparatus of the present embodiment. In this case, by installing the head raising/lowering driving mechanism 7 as a unitized assembly, the strength of the mechanical deck chassis 2 can be sufficiently maintained.

The unit 80 is constructed so as to be mounted from a lower surface side (back side) of the mechanical deck chassis 2 and the installed unit 80 is fixed to the mechanical deck chassis 2 by a fixing screw 92, for example. That is, in the present embodiment, in a state where the unit 80 has been mounted into the mechanical deck chassis 2, the fixing screw 92 is passed through a through-hole 93 (through-holes 92a and 93b of the case 17 and the cover plate 82) of the unit 80 and is screwed to the mechanical deck chassis 2 to fix the unit 80. In this way, the unit 80 of the head raising/lowering driving mechanism 7 mounted in the mechanical deck chassis 2 is integrated with the mechanical deck chassis 2 and is therefore regarded in terms of the construction as one part of the mechanical deck chassis 2.

It should be noted that in this apparatus, PPE (polyphenylene ether) is used as the material of the mechanical deck chassis 2, and the case 17 and the cover plate 82 that compose the unit 80 of the head raising/lowering driving mechanism 7 mounted in the mechanical deck chassis 2 are also formed using the same material, PPE.

In this disc recording/reproducing apparatus 1 according to the present invention, the head raising/lowering driving mechanism 7 that raises and lowers the magnetic head 23 is provided on the mechanical deck chassis 2 side, and is constructed so as to be mounted inside the mechanical deck chassis 2, so that the space inside the apparatus can be used effectively and as a result it is possible to make the apparatus considerably smaller and slimmer.

In particular, in this disc recording/reproducing apparatus 1, by using a construction in which the head raising/lowering driving mechanism 7 is mounted in a dead space of the mechanical deck chassis 2 corresponding to the connecting member 25 that connects the optical pickup 21 of the pickup device 9 and the head arm 24 on which the magnetic head 23 is mounted, the space inside the apparatus can be used even more effectively, which is even more effective in making the apparatus smaller and slimmer.

As described above, the surface of the unit 80 of the head raising/lowering driving mechanism 7 mounted in the mechanical deck chassis 2 is exposed on the same surface as the disc bearing surface of the mechanical deck chassis 2, as shown in FIG. 9. On the surface of the unit 80 that is exposed to the disc bearing surface of the mechanical deck chassis 2, there is formed the positioning protruding part 19 for positioning the disc cartridge 18 in which the magneto-optical disc is enclosed.

This positioning protruding part 19 positions the disc cartridge 18 in concert with the reference pin 13, that is, a pair of reference holes on the disc cartridge 18 are respectively engaged by the positioning protruding part 19 and the reference pin 13 so that the disc cartridge 18 is correctly positioned and the disc cartridge 18 is stably held within the apparatus.

The positioning protruding part 19 is provided on a conventional mechanical deck chassis along with the reference pin 13, and in the apparatus according to the present invention the unit 80 of the head raising/lowering driving mechanism 7 is mounted at a part where the positioning protruding part 19 is provided, and a construction where the positioning protruding part 19 is provided on the unit 80 is therefore used.

By using this construction, in the disc recording/reproducing apparatus 1 according to the present invention, the disc cartridge is stably held and the internal space of the apparatus is effectively used, so that the apparatus can be made smaller and slimmer.

In addition, in this disc recording/reproducing apparatus 1, the head raising/lowering driving mechanism 7 mounted in the mechanical deck chassis 2 is constructed as the single unit 80, so that when the apparatus is assembled, the head raising/lowering driving mechanism 7 can be easily mounted in the mechanical deck chassis 2 in the form of the unit 80. Also, even if the head raising/lowering driving mechanism 7 breaks so that repair is necessary, the head raising/lowering driving mechanism 7 can be replaced by replacing the entire unit 80, which has the advantage that such operations can be carried out easily.

It should be noted that in the present invention described above, a construction in which the unit 80 of the head raising/lowering driving mechanism 7 is fixed to the mechanical deck chassis 2 by the fixing screw 92 is described, but the fixing means of the unit 80 is not limited to a screw, and for example a construction that fits the unit of the head raising/lowering mechanism into or fixes the unit 80 to the mechanical deck chassis by ultrasonic welding may be used.

The embodiments do not limit the present invention regarding the constructions of the other components and it should be obvious that a variety of embodiments can be used within a range that does not depart from the gist of the present invention.

As should be obvious from the above explanation, in the disc recording/reproducing apparatus according to the present invention, a construction is used where a head raising/lowering driving mechanism including a motor, which is the driving source of the head raising/lowering mechanism, is provided in the mechanical deck chassis, so that the space inside the apparatus can be effectively used and there is the effect that the apparatus can be made considerably smaller and slimmer.

The invention claimed is:

1. A recording/reproducing apparatus, comprising:
   a cartridge holder that is rotatably provided in a chassis and configured to receive a disc cartridge, in which a magneto-optical disc is enclosed;
   an optical pickup configured to irradiate laser light onto the magneto-optical disc;
   a magnetic head disposed so as to face the optical pickup on an upper surface side of the cartridge holder and configured to be moved between a lowered position close to the magneto-optical disc and a raised position away from the magneto-optical disc;
   a first sliding member including a first guide groove and configured to move relative to the cartridge holder;
   a second sliding member including a second guide groove, coupled to the cartridge holder, and configured to move with the disc cartridge, relative to the cartridge holder, between an insertion position and a recording/reproducing position, said second sliding member located so as to overlap with the first sliding member;
   a head raising/lowering mechanism coupled to the first sliding member and configured to move the magnetic head between the raised position and the lowered position by moving at least the first sliding member;
   a driving mechanism disposed on a lower surface side of the chassis and configured to engage the first sliding member, and to move the first sliding member; and
   a shaft member, disposed within the first guide groove and the second guide groove, configured to separate the first sliding member from the second sliding member,
   wherein the first sliding member and the second sliding member are disposed so as to overlap in an axial direction of the shaft member.

2. A recording/reproducing apparatus according to claim 1, further comprising:
   an arm member, on one end of which the magnetic head is provided, another end of which is connected to the optical pickup, and the arm member being configured to rotate between the raised position and the lowered position,
   wherein the optical pickup is supported on the chassis so as to be freely movable in a radial direction of the magneto-optical disc, and the arm member is positioned on an upper surface side of the disc cartridge.

3. A recording/reproducing apparatus according to claim 2, wherein
   the head raising/lowering mechanism includes a raising/lowering operating part configured to lift the arm member when the driving mechanism has moved the first sliding member to a first position that has the magnetic head moved to the raised position, and to release support of the arm member when the first sliding member has been moved to a second position that moves the magnetic head to the lowered position, and
   the raising/lowering operating part is integrally formed with the first sliding member.

4. A recording/reproducing apparatus according to claim 3, wherein
   an opening is formed on the upper surface side of the cartridge holder,
   the first sliding member is configured to be freely movable on the upper surface side of the cartridge holder so as to move in a direction parallel to a direction in which the disc cartridge is inserted into the cartridge holder, and
   the raising/lowering operating unit is provided between the upper surface side of the cartridge holder and the arm member so as to cross the opening.

5. A recording/reproducing apparatus according to claim 3, further comprising:
a locking member configured to be operated by the first sliding member; and
an engaged part provided on the chassis,
wherein, when the first sliding member moves to the second position, the locking member is operated by the first sliding member and the locking member and the engaged part engage one another.

6. A recording/reproducing apparatus according to claim 1, further comprising:
a spring provided between the second sliding member and the cartridge holder, and said spring is configured to be energized in a direction in which the disc cartridge is ejected from the cartridge holder.

7. A recording/reproducing apparatus according to claim 6, further comprising:
a locked part provided on the cartridge holder; and
a locking part provided on the second sliding member, wherein
the second sliding member is configured to be moved by the disc cartridge inserted into the cartridge holder so that the locking part engages the locked part, thereby locking the cartridge holder.

8. A recording/reproducing apparatus according to claim 7, further comprising:
a lock releasing member provided on the chassis; and
a lock release operating part provided on the second sliding member, wherein
the lock release operating part is configured to contact the lock releasing member due to a rotation of the cartridge holder, to disengage the locking part from the locked part, and to move the second sliding member with the spring.

9. A recording/reproducing apparatus according to claim 1, wherein
the driving mechanism includes an engaging hook part configured to engage a driving source and the first sliding member,
the driving mechanism is configured to be rotated by a driving force of the driving source, and
the first sliding member is configured to be moved by rotating the engaging hook part during recording onto the magneto-optical disc.

10. A recording/reproducing apparatus according to claim 9, wherein the driving mechanism is provided, on a rotational base side of the cartridge holder, in a direction perpendicular to a direction in which the disc cartridge is inserted into the cartridge holder.

11. A recording/reproducing apparatus according to claim 9, further comprising:
a positioning part configured to position the disc cartridge,
wherein the positioning part is provided on the driving mechanism.

12. A recording/reproducing apparatus, comprising:
a chassis on which an optical pickup and a disc rotation driving part are provided;
a cartridge holder configured to receive a disc cartridge, in which a magneto-optical disc that can be recorded or reproduced is enclosed in a rotatable state, and to hold the disc cartridge, the cartridge holder being attached to the chassis and configured to rotate between a loading position at which the magneto-optical disc inside the held disc cartridge is chucked onto the disc rotation driving part, and an eject position at which the disc cartridge is ejected;
a magnetic head disposed so as to face the optical pickup on an upper surface side of the cartridge holder and configured to be moved via an opening between a lowered position, inserted into the disc cartridge and close to the magneto-optical disc, and a raised position away from the magneto-optical disc;
a first sliding member including a first guide groove and configured to move relative to the cartridge holder at a side part parallel with a direction in which the disc cartridge is inserted into the cartridge holder;
a second sliding member including a second guide groove, coupled to the cartridge member, and configured to move with the disc cartridge, relative to the cartridge holder, between the eject position and the loading position, said second sliding member located so as to overlap with the first sliding member;
a head raising/lowering mechanism coupled to the first sliding member and configured to move the magnetic head between the raised position and the lowered position by moving the first sliding member in the direction of insertion of the disc cartridge;
a driving mechanism disposed on a lower surface side of the chassis and configured to engage the first sliding member and to move the first sliding member; and
a shaft member, disposed within the first guide groove and the second guide groove, configured to separate the first sliding member from the second sliding member,
wherein the first sliding member and the second sliding member are disposed so as to overlap in an axial direction of the shaft member.

13. A recording/reproducing apparatus according to claim 12, further comprising:
an arm member, on one end of which the magnetic head is provided, another end of which is connected to the optical pickup, the arm member configured to rotate between the raised position and the lowered position, and the arm member having an approximately U-shaped cross section,
wherein the optical pickup is supported on the chassis so as to be freely movable in a radial direction of the magneto-optical disc, and the arm member faces the opening on an upper surface side of the disc cartridge.

14. A recording/reproducing apparatus according to claim 13, wherein
the head raising/lowering mechanism includes a raising/lowering operating part configured to lift the arm member when the driving mechanism has moved the first sliding member to a first position that has the magnetic head moved to the raised position, and to release support of the arm member when the first sliding member has been moved to a second position that moves the magnetic head to the lowered position, and
the raising/lowering operating part protrudes from the first sliding member approximately perpendicular to a direction of movement of the first sliding member.

15. A recording/reproducing apparatus according to claim 14, wherein the raising/lowering operating part is provided between the upper surface of the cartridge holder and the arm member so as to cross the opening.

16. A recording/reproducing apparatus according to claim 14, further comprising:
a locking member configured to be operated by the first sliding member; and
an engaged part provided on the chassis, wherein, when the first sliding member moves to the second position, the locking member is configured to be operated by the first sliding member and to engage the engaged part.

17. A recording/reproducing apparatus according to claim 12, further comprising:
a spring provided between the second sliding member and the cartridge holder, and said spring is configured to be energized in a direction in which the disc cartridge is ejected from the cartridge holder.

18. A recording/reproducing apparatus according to claim 17, further comprising:
a locked part provided on the cartridge holder; and
a locking part provided on the second sliding member, wherein
the locking part is configured to engage the locked part to lock the cartridge holder when the second sliding member is moved by the disc cartridge inserted into the cartridge holder.

19. A recording/reproducing apparatus according to claim 18, further comprising:
a lock releasing member disposed on one side surface of the chassis; and
a lock release operating part provided on the second sliding member, wherein
the lock release operating part is configured to contact the lock releasing member due to a rotation of the cartridge holder, to disengage the locking part from the locked part, and to move the second sliding member with the spring.

20. A recording/reproducing apparatus according to claim 12, wherein
the driving mechanism includes an engaging hook part configured to engage a driving source and the first sliding member,
the driving mechanism is configured to be rotated by a driving force of the driving source, and
the first sliding member is configured to be moved by rotating the engaging hook part during recording onto the magneto-optical disc.

21. A recording/reproducing apparatus according to claim 20, wherein the driving mechanism is provided, on a rotational base side of the cartridge holder, in a direction perpendicular to the direction in which the disc cartridge is inserted into the cartridge holder.

22. A recording/reproducing apparatus according to claim 1, wherein
the shaft member includes a larger diameter part and a smaller diameter part,
the first guide groove is slideably engaged with the larger diameter part, and
the second guide groove is slideably engaged with the smaller diameter part.

23. A recording/reproducing apparatus according to claim 1, wherein a length of the larger diameter part in an axial direction of the larger diameter part is greater than a thickness of the first guide groove in the axial direction such that a gap is formed between the first sliding member and the second sliding member.

24. A recording/reproducing apparatus according to claim 12, wherein
the shaft member includes a larger diameter part and a smaller diameter part,
the first guide groove is slideably engaged with the larger diameter part, and
the second guide groove is slideably engaged with the smaller diameter part.

25. A recording/reproducing apparatus according to claim 12, wherein a length of the larger diameter part in an axial direction of the larger diameter part is greater than a thickness of the first guide groove in the axial direction such that a gap is formed between the first sliding member and the second sliding member.

* * * * *